US012417588B2

(12) United States Patent
Evangelidis et al.

(10) Patent No.: US 12,417,588 B2
(45) Date of Patent: Sep. 16, 2025

(54) FAST AR DEVICE PAIRING USING DEPTH PREDICTIONS

(71) Applicant: Snap Inc., Santa Monica, CA (US)

(72) Inventors: Georgios Evangelidis, Vienna (AT); Branislav Micusik, St.Andrae-Woerdern (AT); Jakob Zillner, Absdorf (AT); Nathan Jacob Litke, Redondo Beach, CA (US)

(73) Assignee: Snap Inc., Santa Monica, CA (US)

( * ) Notice: Subject to any disclaimer, the term of this patent is extended or adjusted under 35 U.S.C. 154(b) by 337 days.

(21) Appl. No.: 17/893,723

(22) Filed: Aug. 23, 2022

(65) Prior Publication Data
US 2023/0401796 A1 Dec. 14, 2023

(30) Foreign Application Priority Data

Jun. 8, 2022 (GR) .................................. 0220100478

(51) Int. Cl.
*G06T 19/00* (2011.01)
*G06T 7/55* (2017.01)
(Continued)

(52) U.S. Cl.
CPC ............ *G06T 19/006* (2013.01); *G06T 7/55* (2017.01); *G06T 7/74* (2017.01); *G06T 19/20* (2013.01);
(Continued)

(58) Field of Classification Search
CPC ......... G06T 19/006; G06T 7/74; G06T 19/20; G06T 2207/10028; G06T 2207/30244;
(Continued)

(56) References Cited

U.S. PATENT DOCUMENTS

| 10,290,049 | B1 * | 5/2019 | Xu .......................... G06T 19/20 |
| 2019/0026948 | A1 * | 1/2019 | Kellogg ................ G06T 19/006 |

(Continued)

FOREIGN PATENT DOCUMENTS

| CN | 112581629 A | * 3/2021 | ............. G06T 17/00 |
| WO | WO-2019174377 A1 | * 9/2019 | ............. G06T 17/00 |
| WO | 2023239776 | 12/2023 | |

OTHER PUBLICATIONS

Jae-Won Kam, Robust and Fast Collaborative Augmented Reality Framework Based on Monocular SLAM, Aug. 2020, IEIE Transactions on Smart Processing and Computing, vol. 9, No. 4, pp. 325-335 (Year: 2020).*

(Continued)

*Primary Examiner* — Michael P LaPage
(74) *Attorney, Agent, or Firm* — Schwegman Lundberg & Woessner, P.A.

(57) ABSTRACT

A method for aligning coordinate systems from separate augmented reality (AR) devices is described. In one aspect, the method includes generating predicted depths of a first point cloud by applying a pre-trained model to a first single image generated by a first monocular camera of a first augmented reality (AR) device, and first sparse 3D points generated by a first SLAM system at the first AR device, generating predicted depths of a second point cloud by applying the pre-trained model to a second single image generated by a second monocular camera of the second AR device, and second sparse 3D points generated by a second SLAM system at the second AR device, determining a relative pose between the first AR device and the second AR device by registering the first point cloud with the second point cloud.

20 Claims, 16 Drawing Sheets

(51) Int. Cl.
*G06T 7/73* (2017.01)
*G06T 19/20* (2011.01)
*G06V 20/20* (2022.01)

(52) U.S. Cl.
CPC .... *G06V 20/20* (2022.01); *G06T 2207/10028* (2013.01); *G06T 2207/30244* (2013.01); *G06T 2219/024* (2013.01)

(58) Field of Classification Search
CPC ..... G06T 2219/024; G06T 2207/10024; G06T 2207/20084; G06T 7/55; G06V 20/20; G06F 3/011; G06F 3/012
See application file for complete search history.

(56) References Cited

U.S. PATENT DOCUMENTS

| | | | | |
|---|---|---|---|---|
| 2019/0197788 | A1* | 6/2019 | Forbes | G06T 15/005 |
| 2020/0242835 | A1* | 7/2020 | Cherukuri | G06T 19/006 |
| 2020/0394012 | A1* | 12/2020 | Wright, Jr. | G06F 3/005 |
| 2021/0142497 | A1* | 5/2021 | Pugh | G06T 7/543 |
| 2021/0174570 | A1* | 6/2021 | Bleyer | G02B 27/017 |
| 2021/0326584 | A1* | 10/2021 | Kim | G06V 40/20 |
| 2021/0373336 | A1* | 12/2021 | Price | G02B 27/0172 |
| 2023/0161418 | A1* | 5/2023 | Gribetz | G06F 3/011 |
| | | | | 345/156 |

OTHER PUBLICATIONS

Fangchang Ma, Sparse-to-Dense: Depth Prediction from Spart Depth Samples and a Single Image, 2018, arXiv:1709.047492v2, pp. 1-8 (Year: 2018).*

"International Application Serial No. PCT/US2023/024688, International Search Report mailed Sep. 21, 2023", 4 pgs.

"International Application Serial No. PCT/US2023/024688, Written Opinion mailed Sep. 21, 2023", 7 pgs.

Ran, Xukan Xran, "Multi-user augmented reality with communication efficient and spatially consistent virtual objects", Proceedings of the IEEE ACM 42nd International Conference on Software Engineering Workshops, Acmpub27, New York, NY, USA,, (Nov. 23, 2020), 386-398.

* cited by examiner

FAST AR DEVICE PAIRING USING DEPTH PREDICTIONS

CLAIM OF PRIORITY

This application claims the benefit of priority to Greece Application Serial No. 20220100478, filed Jun. 8, 2022, which is incorporated herein by reference in its entirety.

TECHNICAL FIELD

The subject matter disclosed herein generally relates to an augmented reality (AR) device. Specifically, the present disclosure addresses systems and methods for pairing AR devices using depth predictions from monocular cameras.

BACKGROUND

An augmented reality (AR) device enables a user to observe a scene while simultaneously seeing relevant virtual content that may be aligned to items, images, objects, or environments in the field of view of the device. A virtual reality (VR) device provides a more immersive experience than an AR device. The VR device blocks out the field of view of the user with virtual content that is displayed based on a position and orientation of the VR device.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
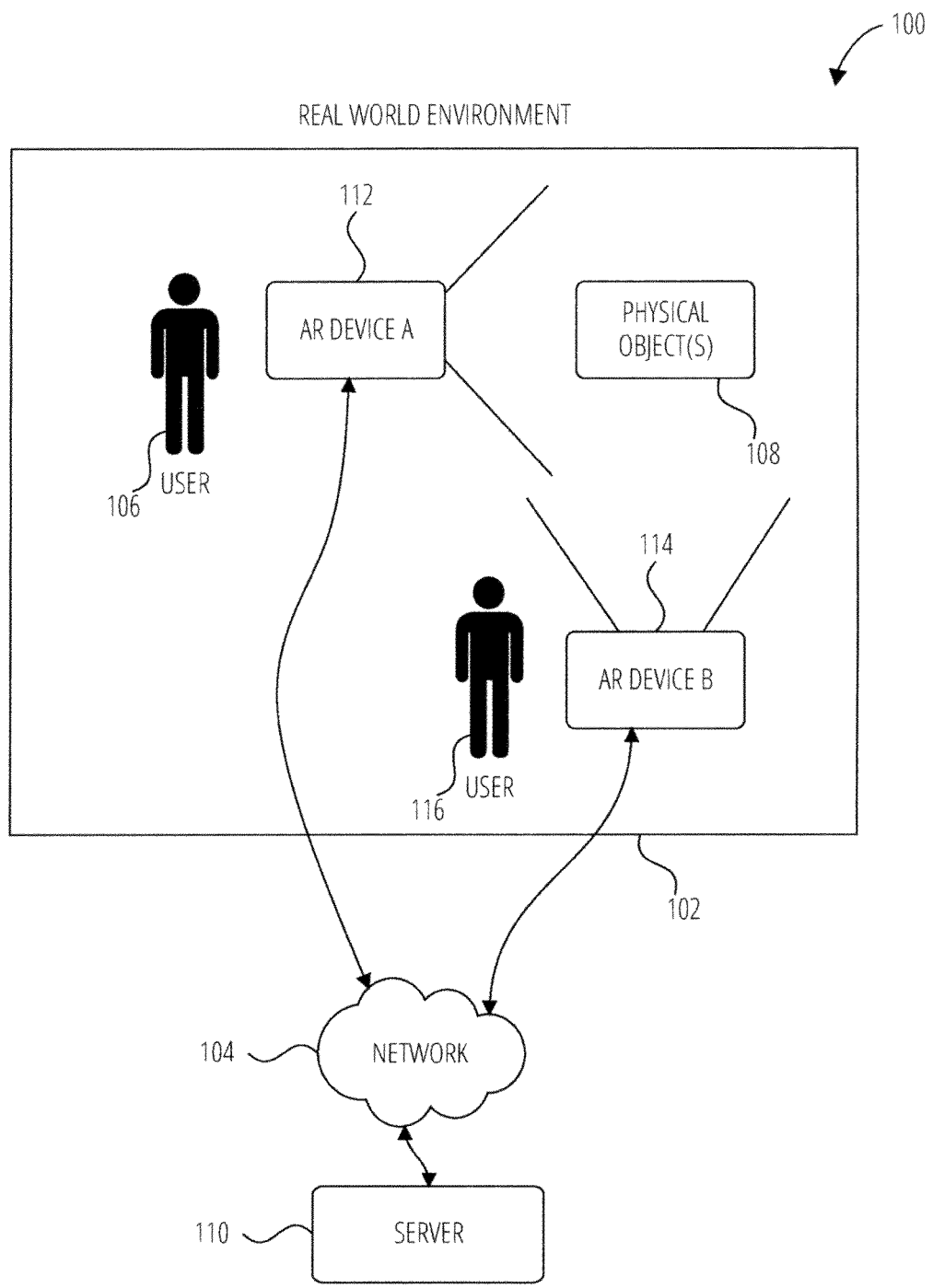
FIG. 1 is a block diagram illustrating a network environment for a collaborative augmented reality experience in accordance with one example embodiment.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural Components, such as modules) are optional and may be combined or subdivided, and operations (e.g., in a procedure, algorithm, or other function) may vary in sequence or be combined or subdivided.

The term "augmented reality" (AR) is used herein to refer to an interactive experience of a real-world environment where physical objects that reside in the real-world are "augmented" or enhanced by computer-generated digital content (also referred to as virtual content or synthetic content). AR can also refer to a system that enables a combination of real and virtual worlds, real-time interaction, and 3D registration of virtual and real objects. A user of an AR system perceives virtual content that appears to be attached or interact with a real-world physical object.

The term "virtual reality" (VR) is used herein to refer to a simulation experience of a virtual world environment that is completely distinct from the real-world environment. Computer-generated digital content is displayed in the virtual world environment. VR also refers to a system that enables a user of a VR system to be completely immersed in the virtual world environment and to interact with virtual objects presented in the virtual world environment.

The term "AR application" is used herein to refer to a computer-operated application that enables an AR experience. The term "VR application" is used herein to refer to a computer-operated application that enables a VR experience. The term "AR/VR application" refers to a computer-operated application that enables a combination of an AR experience or a VR experience.

The term "visual tracking system" is used herein to refer to a computer-operated application or system that enables a system to track visual features identified in images captured by one or more cameras of the visual tracking system. The visual tracking system builds a model of a real-world environment based on the tracked visual features. Non-limiting examples of the visual tracking system include: a visual Simultaneous Localization and Mapping system (VSLAM), and Visual Inertial Odometry (VIO) system. VSLAM can be used to build a target from an environment, or a scene based on one or more cameras of the visual tracking system. A VIO system (also referred to as a visual-inertial tracking system) determines a latest pose (e.g., position and orientation) of a device based on data acquired from multiple sensors (e.g., optical sensors, inertial sensors) of the device.

The term "Inertial Measurement Unit" (IMU) is used herein to refer to a device that can report on the inertial status of a moving body including the acceleration, velocity, orientation, and position of the moving body. An IMU enables tracking of movement of a body by integrating the acceleration and the angular velocity measured by the IMU. IMU can also refer to a combination of accelerometers and gyroscopes that can determine and quantify linear acceleration and angular velocity, respectively. The values obtained from the IMUs gyroscopes can be processed to obtain the pitch, roll, and heading of the IMU and, therefore, of the body with which the IMU is associated. Signals from the IMU's accelerometers also can be processed to obtain velocity and displacement of the IMU.

The term "three-degrees of freedom tracking system" (3DOF tracking system) is used herein to refer to a device that tracks rotational movement. For example, the 3DOF tracking system can track whether a user of a head-wearable device is looking left or right, rotating their head up or down, and pivoting left or right. However, the head-wearable device cannot use the 3DOF tracking system to determine whether the user has moved around a scene by moving in the physical world. As such, 3DOF tracking system may not be accurate enough to be used for positional signals. The 3DOF tracking system may be part of an AR/VR display device that includes IMU sensors. For example, the 3DOF tracking system uses sensor data from sensors such as accelerometers, gyroscopes, and magnetometers.

The term "six-degrees of freedom tracking system" (6DOF tracking system) is used herein to refer to a device that tracks rotational and translational motion. For example, the 6DOF tracking system can track whether the user has rotated their head and moved forward or backward, laterally or vertically and up or down. The 6DOF tracking system may include a Simultaneous Localization and Mapping (SLAM) system and/or a VIO system that relies on data acquired from multiple sensors (e.g., depth cameras, inertial sensors). The 6DOF tracking system analyzes data from the sensors to accurately determine the pose of the display device.

Each AR device may include its own 6DOF tracking system that generates its own reference coordinate system/frame. As such, two or more AR devices may have two or more different reference coordinate systems that are to be aligned to express the pose of any of the AR devices in a common coordinate system. Each AR device generates a dense point cloud based on its corresponding reference coordinate system. However, using a conventional depth sensor (e.g., using stereo vision camera) to generate the dense point cloud can be time-consuming. High-resolution depth is computed by processing visual information, which is a computationally demanding process. Typically, the AR device estimates a depth map for the whole image area of every processed frame. However, depth estimation in portable AR device may not be performed for every frame due to limited computational resources and power constraints. Similarly, pre-building a map of an existing physical environment can be time consuming and may raise privacy issues. Other standard solutions include the use of a marker (e.g., a predefined 2D image) to synchronize the coordinate systems of each AR device.

The present application describes a system that enables two or more AR devices to share an AR experience by using single-view depth predictions to align the different coordinate systems of each AR device. In order to share AR experiences, the coordinates systems are aligned, so that poses (e.g., 3D position+orientation) of any device are expressed in a common coordinate system. The system uses depth-from-SLAM (VI-SLAM) to predict depth and reconstruct dense point cloud(s) from a single image per AR device. Each AR device perceives a same scene but from different viewpoints. The system determines a relative pose of the AR devices (e.g., relative pose between VIO reference frames) by aligning/registering the overlapping regions of the point clouds. The system uses the relative pose to align in 3D the VIO reference coordinate frames of the AR devices for shared AR experiences.

In one example embodiment, a method for aligning coordinate systems from separate augmented reality (AR) devices is described. In one aspect, the method includes generating predicted depths of a first point cloud by applying a pre-trained model to a first single image generated by a first monocular camera of a first augmented reality (AR) device, and first sparse 3D points generated by a first SLAM system at the first AR device, generating predicted depths of a second point cloud by applying the pre-trained model to a second single image generated by a second monocular camera of the second AR device, and second sparse 3D points generated by a second SLAM system at the second AR device, determining a relative pose between a first reference coordinate frame of the first AR device and a second reference coordinate frame of the second AR device by registering the first point cloud with the second point cloud based on corresponding predicted depths, and providing the relative pose to at least one of the first AR device or the second AR device.

As a result, one or more of the methodologies described herein facilitate solving the technical problem of resource management from aligning coordinate systems from separate augmented reality (AR) devices. The presently described method provides an improvement to an operation of the functioning of a computer by providing power consumption reduction. As such, one or more of the methodologies described herein may obviate a need for certain efforts or computing resources. Examples of such computing resources include processor cycles, network traffic, memory usage, data storage capacity, power consumption, network bandwidth, and cooling capacity.

FIG. 1 is a network diagram illustrating a network environment 100 suitable for operating an AR device A 112, an AR device B 114, and a server 110, according to some example embodiments. The network environment 100 includes the AR device A 112, the AR device B 114, and the server 110, communicatively coupled to each other via a network 104. The AR device A 112, AR device B 114, and the server 110 may each be implemented in a computer system, in whole or in part, as described below with respect to FIG. 16. The server 110 may be part of a network-based system. For example, the network-based system may be or include a cloud-based server system that provides additional information, such as reference frame alignment data of the AR device A 112 and the AR device B 114.

A user 106 operates the AR device A 112. The user 106 may be a human user (e.g., a human being), a machine user (e.g., a computer configured by a software program to interact with the AR device A 112), or any suitable combination thereof (e.g., a human assisted by a machine or a machine supervised by a human). The user 106 operates the AR device A 112 by pointing the AR device A 112 towards physical object(s) 108 in the real world environment 102.

A user 116 operates the AR device B 114. The user 116 may be a human user (e.g., a human being), a machine user (e.g., a computer configured by a software program to interact with the AR device B 114), or any suitable combination thereof (e.g., a human assisted by a machine or a machine supervised by a human). The user 116 operates the AR device B 114 by pointing the AR device B 114 towards physical object(s) 108 in the real world environment 102.

The AR device A 112 and the AR device B 114, each may be a computing device with a display such as a smartphone, a tablet computer, or a wearable computing device (e.g., watch or glasses). The computing device may be hand-held or may be removable mounted to a head of a user (e.g., user 106, user 116). In one example, the display may be a screen that displays what is captured with a camera of the AR device A 112/AR device B 114. In another example, the display of the device may be transparent, such as in lenses of wearable computing glasses, that allow a user to view content presented on the display while simultaneously viewing real world object visible through the display.

The user 106 operates an AR application at the AR device A 112. The AR application may be configured to provide the user 106 with an AR experience triggered by a physical object(s) 108, such as a two-dimensional physical object (e.g., a picture), a three-dimensional physical object (e.g., a statue), a location (e.g., at factory), or any references (e.g., perceived corners of walls or furniture) in the real world environment 102. For example, the user 106 may point a camera of the AR device A 112 to capture an image of the physical object(s) 108.

The user 116 operates an AR application at the AR device B 114. The AR application may be configured to provide the user 116 with an AR experience triggered by the physical object(s) 108, such as a two-dimensional physical object (e.g., a picture), a three-dimensional physical object (e.g., a statue), a location (e.g., at factory), or any references (e.g., perceived corners of walls or furniture) in the real world environment 102. For example, the AR device B 114 may point a camera of the AR device B 114 to capture an image of the physical object(s) 108 from a different viewpoint (relative to AR device A 112). As such, the images captured by the AR device A 112 and the AR device B 114 include overlapping regions.

The AR device A 112 includes a tracking system (not shown). The tracking system tracks the pose (e.g., position and orientation) of the AR device A 112 relative to the real world environment 102 using optical sensors (e.g., image camera), inertia sensors (e.g., gyroscope, accelerometer), wireless sensors (Bluetooth, Wi-Fi), GPS sensor, and audio sensor to determine the location of the AR device A 112 within the real world environment 102. In one example, the tracking system of the AR device A 112 uses a single image from a monocular camera of the AR device A 112 and sparse 3D points to predict a dense depth map and reconstruct a corresponding dense point cloud.

The AR device B 114 includes a tracking system (not shown). The tracking system tracks the pose (e.g., position and orientation) of the AR device B 114 relative to the real world environment 102 using optical sensors (e.g., image camera), inertia sensors (e.g., gyroscope, accelerometer), wireless sensors (Bluetooth, Wi-Fi), GPS sensor, and audio sensor to determine the location of the AR device B 114 within the real world environment 102. In one example, the tracking system of the AR device B 114 uses a single image from a monocular camera of the AR device B 114 and sparse 3D points to predict depth and reconstruct a dense point cloud.

In one example embodiment, the server 110 receives the dense cloud point from AR device A 112 and AR device B 114 and aligns the dense point cloud between the AR device A 112 and the AR device B 114 to obtain the relative pose between the VIO reference frames of the AR device A 112 and AR device B 114. The server 110 provides the alignment data (e.g., relative pose data) to the AR device A 112 and the AR device B 114. In another example, the alignment of the dense point clouds may be performed on either AR device A 112, AR device B 114, or the server 110, or a combination between the AR device A 112, AR device B 114, and the server 110.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIG. 10. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 104 may be any network that enables communication between or among machines (e.g., server 110), databases, and devices (e.g., AR device A 112, AR device B 114). Accordingly, the network 104 may be a wired network, a wireless network (e.g., a mobile or cellular network), or any suitable combination thereof. The network 104 may include one or more portions that constitute a private network, a public network (e.g., the Internet), or any suitable combination thereof.

Figure 2:
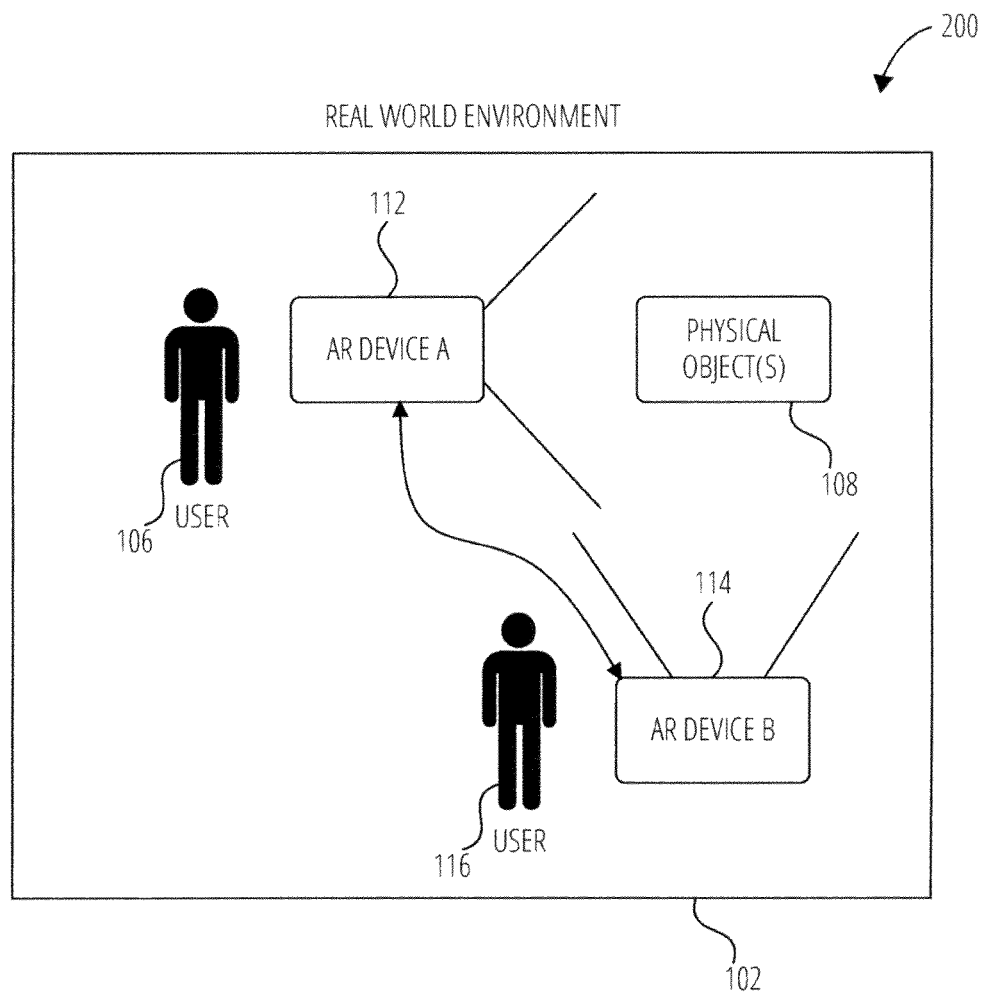
FIG. 2 is a block diagram illustrating a network environment for a collaborative augmented reality experience in accordance with another example embodiment.

FIG. 2 is a block diagram illustrating a network environment 200 for a collaborative augmented reality experience in accordance with another example embodiment. The network environment 200 includes the AR device A 112 and the AR device B 114. One the AR devices receives the dense point cloud from the other AR device and performs the alignment. For example, AR device B 114 provides the dense point cloud to AR device A 112. The AR device A 112 aligns the dense point cloud from the AR device A 112 with the dense point cloud from AR device B 114 to obtain the relative pose between the VIO reference frames of the AR device A 112 and AR device B 114. The AR device A 112 uses the relative pose to align in 3D the VIO reference coordinate frames of AR device A 112 with AR device B 114. The AR device A 112 uses the aligned VIO reference coordinate frames to display a virtual object anchored to the physical object(s) 108 or the real world environment 102.

Figure 3:
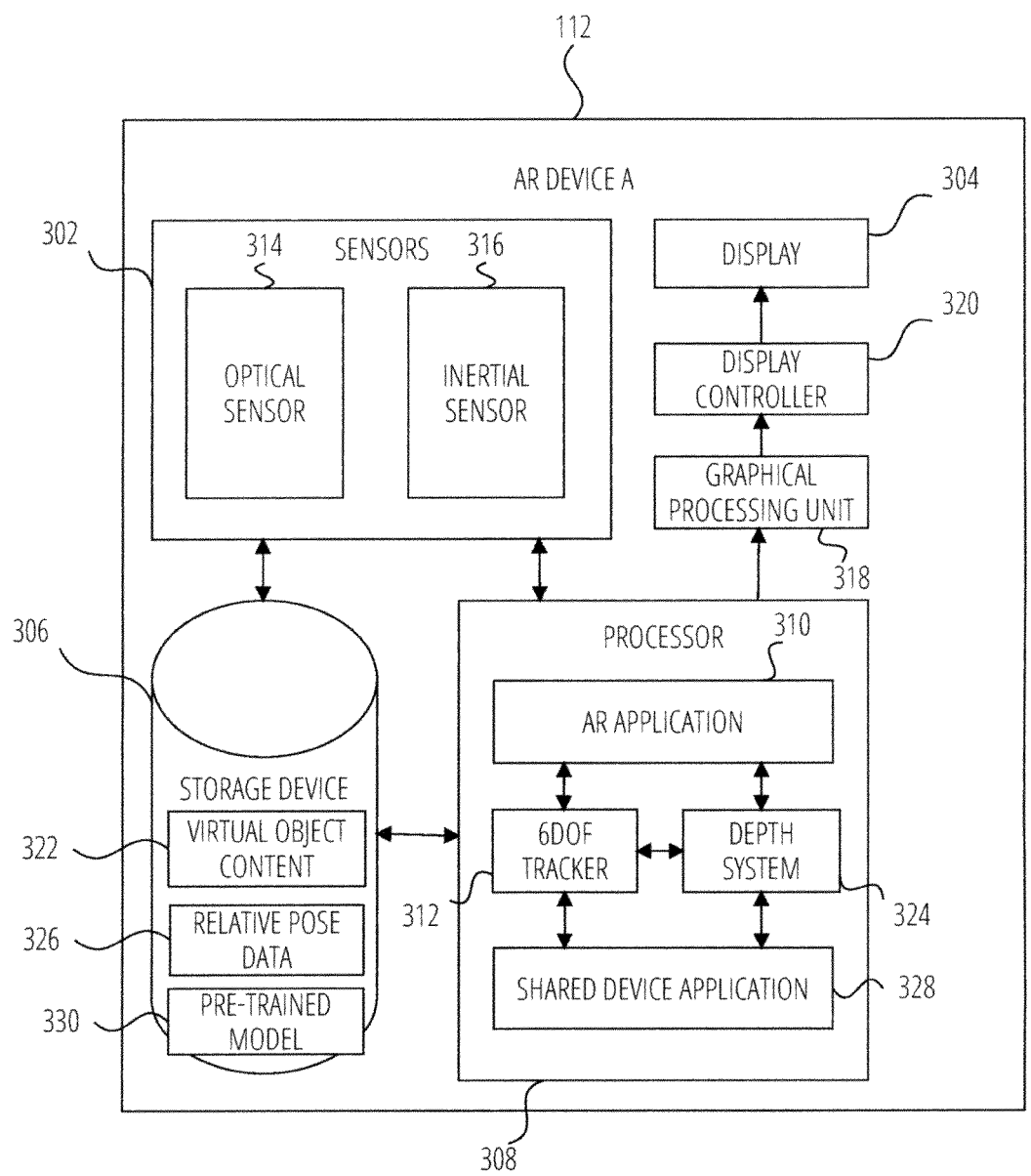
FIG. 3 is a block diagram illustrating an AR device in accordance with one example embodiment.

FIG. 3 is a block diagram illustrating modules (e.g., components) of the AR device A 112, according to some example embodiments. The AR device A 112 includes sensors 302, a display 304, a processor 308, a Graphical processing unit 318, a display controller 320, and a storage device 306. Examples of the AR device A 112 include a wearable computing device, a tablet computer, or a smart phone.

The sensors 302 include an optical sensor 314 and an inertial sensor 316. The optical sensor 314 includes a monocular camera. The inertial sensor 316 includes a combination of gyroscope, accelerometer, magnetometer. Other examples of sensors 302 include a proximity or location sensor (e.g., near field communication, GPS, Bluetooth, Wifi), an audio sensor (e.g., a microphone), or any suitable combination thereof. It is noted that the sensors 302 described herein are for illustration purposes and the sensors 302 are thus not limited to the ones described above. In one example embodiment, the AR device A 112 does not include a depth sensor such as a structured-light sensor, a time-of-flight sensor, passive stereo sensor, and an ultrasound device, time-of-flight sensor.

The display 304 includes a screen or monitor configured to display images generated by the processor 308. In one example embodiment, the display 304 may be transparent or semi-transparent so that the user 106 can see through the display 304 (in AR use case). In another example, the display 304, such as a LCOS display, presents each frame of virtual content in multiple presentations.

The processor 308 includes an AR application 310, a 6DOF tracker 312, a depth system 324, and a shared device application 328. The AR application 310 detects and identifies a physical environment or the physical object(s) 108 using computer vision. The AR application 310 retrieves a virtual object (e.g., 3D object model) based on the identified physical object(s) 108 or physical environment. The display 304 displays the virtual object. The AR application 310 includes a local rendering engine that generates a visualization of a virtual object overlaid (e.g., superimposed upon, or otherwise displayed in tandem with) on an image of the physical object(s) 108 captured by the optical sensor 314. A visualization of the virtual object may be manipulated by adjusting a position of the physical object(s) 108 (e.g., its physical location, orientation, or both) relative to the optical sensor 314. Similarly, the visualization of the virtual object may be manipulated by adjusting a pose of the AR device A 112 relative to the physical object(s) 108.

The 6DOF tracker 312 estimates a pose of the AR device A 112. For example, the 6DOF tracker 312 uses image data and corresponding inertial data from the optical sensor 314 and the inertial sensor 316 to track a location and pose of the AR device A 112 relative to a frame of reference (e.g., real world environment 102). In one example, the 6DOF tracker 312 uses the sensor data to determine the three-dimensional pose of the AR device A 112. The three-dimensional pose is a determined orientation and position of the AR device A 112 in relation to the user's real world environment 102. For example, the AR device A 112 may use images of the user's real world environment 102, as well as other sensor data to identify a relative position and orientation of the AR device A 112 from physical objects in the real world environment 102 surrounding the AR device A 112. The 6DOF tracker 312 continually gathers and uses updated sensor data describing movements of the AR device A 112 to determine updated three-dimensional poses of the AR device A 112 that indicate changes in the relative position and orientation of the AR device A 112 from the physical objects in the real world environment 102. The 6DOF tracker 312 provides the three-dimensional pose of the AR device A 112 to the 324 and the shared device application 328.

The depth system 324 accesses a single image from the optical sensor 314 (e.g., monocular camera) and sparse 3D points from the 6DOF tracker 312 to predict depths and generate a dense point cloud. In one example embodiment, the AR device A 112 does not include a depth sensor or a stereo sensor. The depth system 324 uses a trained model based on the single image and sparse 3D points to predict depths and generate the dense point cloud. The depth system 324 is described in more detail below with respect to FIG. 4.

The shared device application 328 accesses the dense point cloud from AR device A 112 and the dense point cloud from AR device B 114 and performs a registration of the dense point cloud based on the partial overlapped regions of the respective dense point clouds. The shared device application 328 identifies the relative pose between the AR device A 112 and the AR device B 114. The AR application 310 uses the relative pose to enable sharing of AR experience between the two AR devices. For example, the correct location/perspective of a virtual object is accurately presented in both the AR device A 112 and the AR device B 114 (e.g., user 116 points to a country on a virtual globe, AR device A 112 displays the virtual globe so that user 106 can see the same country that user 116 is pointing to (as perceived from the perspective of user 106). Example components of the shared device application 328 are described further below with respect to FIG. 6.

The Graphical processing unit 318 includes a render engine (not shown) that is configured to render a frame of a 3D model of a virtual object based on the virtual content provided by the AR application 310 and the pose of the AR device A 112 (relative to AR device B 114). In other words, the Graphical processing unit 318 uses the three-dimensional pose of the AR device A 112 to generate frames of virtual content to be presented on the display 304. For example, the Graphical processing unit 318 uses the three-dimensional pose to render a frame of the virtual content such that the virtual content is presented at an orientation and position in the display 304 to properly augment the user's reality. As an example, the Graphical processing unit 318 may use the three-dimensional pose data to render a frame of virtual content such that, when presented on the display 304, the virtual content overlaps with a physical object in the user's real world environment 102. The Graphical processing unit 318 generates updated frames of virtual content based on updated three-dimensional poses of the AR device A 112, which reflect changes in the position and orientation of the user in relation to physical objects in the user's real world environment 102.

The Graphical processing unit 318 transfers the rendered frame to the display controller 320. The display controller 320 is positioned as an intermediary between the Graphical processing unit 318 and the display 304, receives the image data (e.g., rendered frame) from the Graphical processing unit 318, provides the rendered frame to display 304.

The storage device 306 stores virtual object content 322, relative pose data 326 (e.g., relative pose between AR device A 112 and AR device B 114), and a pre-trained model 330. The virtual object content 322 includes, for example, a database of visual references (e.g., images, QR codes) and corresponding virtual content (e.g., three-dimensional model of virtual objects). The relative pose data 326 indicate relative pose between a first reference coordinate frame of the first AR device and a second reference coordinate frame of the second AR device by registering the first point cloud with the second point cloud based on corresponding predicted depths. The pre-trained model 330 includes a machine learning model that is trained with (monocular) images provided by a plurality of AR devices and corresponding pose data.

Any one or more of the modules described herein may be implemented using hardware (e.g., a Processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 4:
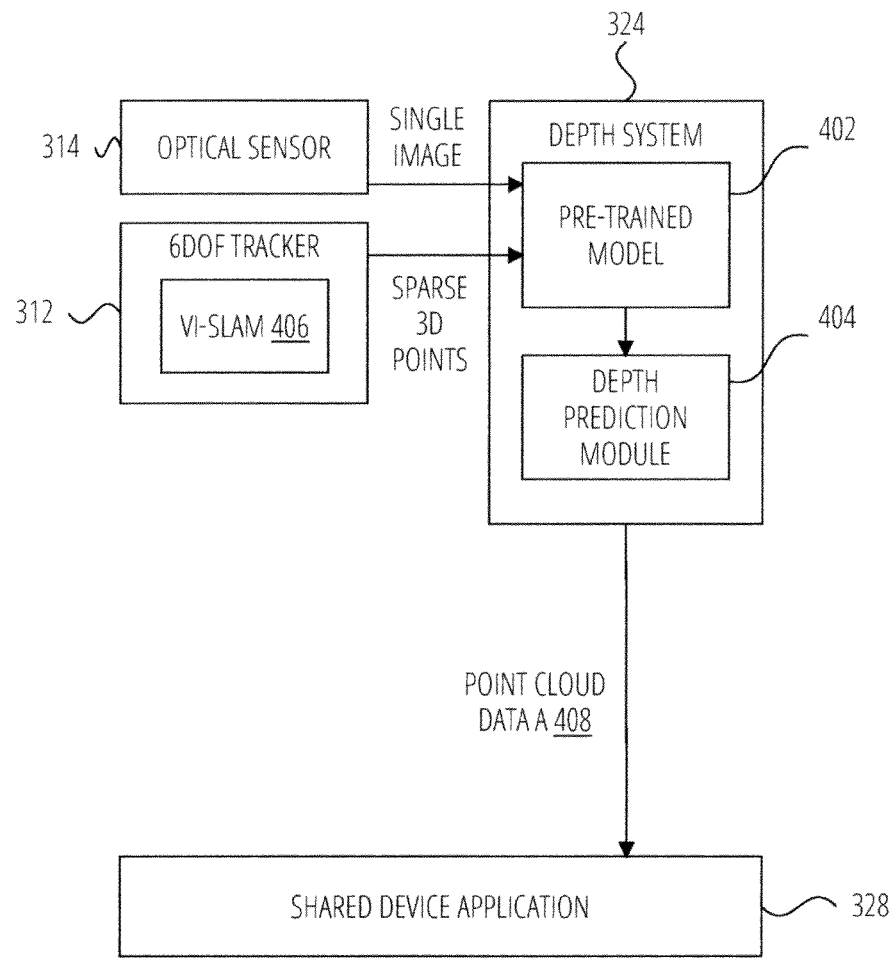
FIG. 4 is a block diagram illustrating a process for reconstructing a dense point cloud in accordance with one example embodiment.

FIG. 4 is a block diagram illustrating a process for reconstructing a dense point cloud in accordance with one example embodiment. The 6DOF tracker 312 includes a VI-SLAM 406. The VI-SLAM 406 can be used to identify sparse 3D points from the real world environment 102. The VI-SLAM 406 (also referred to as a visual-inertial tracking system) determines a latest pose (e.g., position and orientation) of the AR device A 112 based on data acquired from multiple sensors (e.g., optical sensors, inertial sensors) of the AR device A 112. In one example, the 6DOF tracker 312 provides a single image from a monocular camera of the AR device A 112 and sparse 3D points to the depth system 324. Sparse 3D points referred to as 3D points are tracked and 3D reconstructed by the VI-SLAM 406.

The depth system 324 receives the single image from the optical sensor 314 (e.g., monocular camera) and the sparse 3D points from the 6DOF tracker 312. The depth system 324 generates a dense point cloud by predicting the depths in the single image using a trained machine learning model (e.g., pre-trained model 402). In one example, the depth system 324 includes a deep neural network that provides depths from a single image.

The depth system 324 includes a pre-trained model 402 and a depth prediction module 404. The pre-trained model 402 is trained with images generated by AR devices and pose data corresponding to the images. As such, the AR device A 112 does not include a pre-mapping or pre-building of the real world environment 102. In other words, the AR device A 112 does not build a detailed model of the real world environment 102. An example of a machine learning training program is described in more detail below with respect to FIG. 5.

The depth prediction module 404 applies the single image and sparse 3D points to the pre-trained model 402 to predict depths in the single image and to generate a dense 3D point cloud (e.g., point cloud data A 408) based on the predicted depths. The depth system 324 provides the point cloud data A 408 to the shared device application 328 for aligning the VIO reference coordinate frames of the AR devices.

Figure 5:
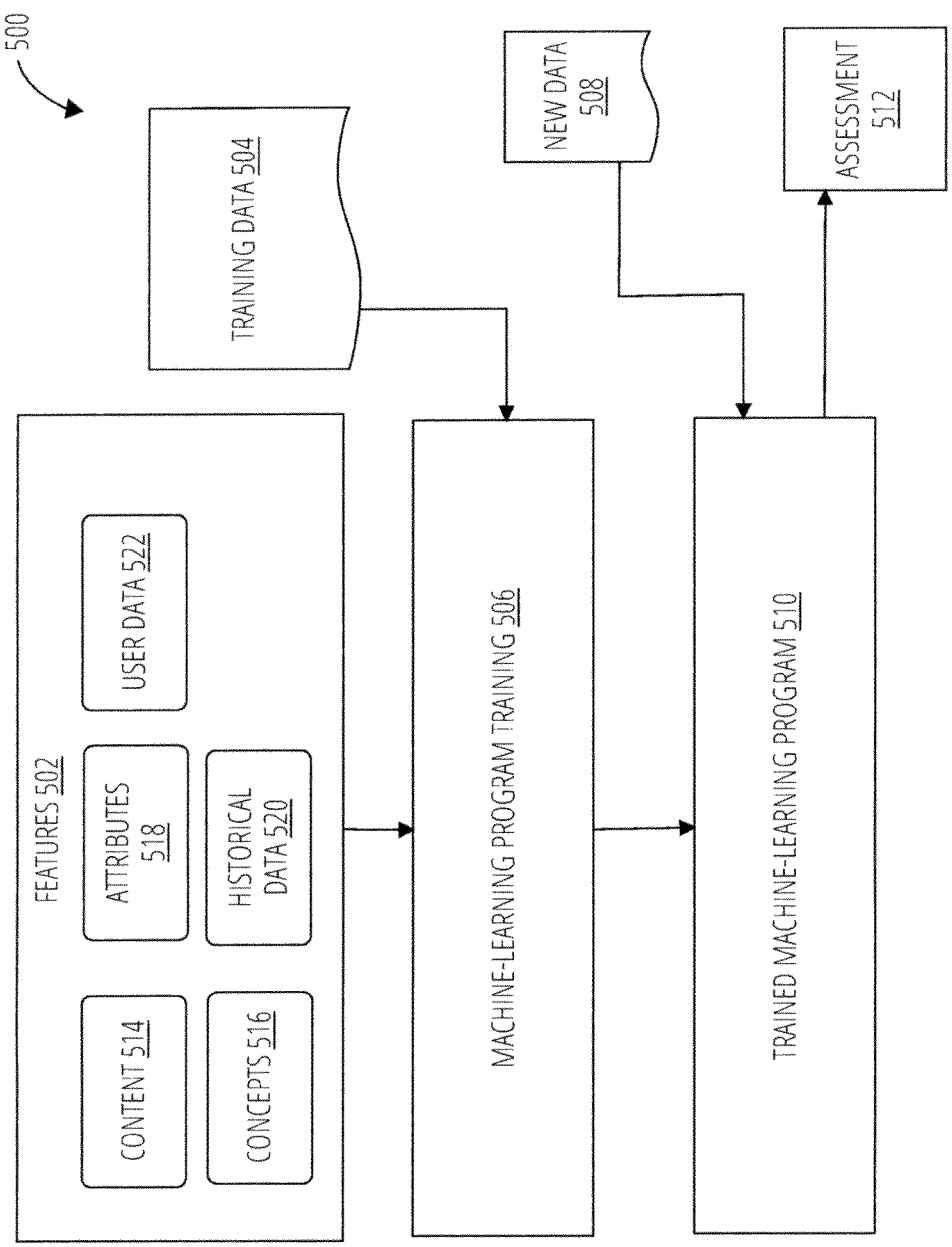
FIG. 5 illustrates training and use of a machine-learning program, according to some example embodiments.

FIG. 5 illustrates training and use of a machine-learning program 500, according to some example embodiments. In some example embodiments, machine-learning programs (MLPs), also referred to as machine-learning algorithms or tools, are used to perform operations associated with dense point cloud depths prediction.

Machine learning is a field of study that gives computers the ability to learn without being explicitly programmed. Machine learning explores the study and construction of algorithms, also referred to herein as tools, that may learn from existing data and make predictions about new data. Such machine-learning tools operate by building a model from example training data 504 in order to make data-driven predictions or decisions expressed as outputs or assessments (e.g., assessment 512). Although example embodiments are presented with respect to a few machine-learning tools, the principles presented herein may be applied to other machine-learning tools.

In some example embodiments, different machine-learning tools may be used. For example, Logistic Regression (LR), Naive-Bayes, Random Forest (RF), neural networks (NN), matrix factorization, and Support Vector Machines (SVM) tools may be used for classifying or scoring job postings.

Two common types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number).

The machine-learning algorithms use features 502 for analyzing the data to generate an assessment 512. Each of the features 502 is an individual measurable property of a phenomenon being observed. The concept of a feature is related to that of an explanatory variable used in statistical techniques such as linear regression. Choosing informative, discriminating, and independent features is important for the effective operation of the MLP in pattern recognition, classification, and regression. Features may be of different types, such as numeric features, strings, and graphs.

In one example embodiment, the features 502 may be of different types and may include one or more of content 514, concepts 516, attributes 518, historical data 520 and/or user data 522, merely for example.

The machine-learning algorithms use the training data 504 to find correlations among the identified features 502 that affect the outcome or assessment 512. In some example embodiments, the training data 504 includes labeled data, which is known data for one or more identified features 502 and one or more outcomes, such as detecting depths patterns.

With the training data 504 and the identified features 502, the machine-learning tool is trained at machine-learning program training 506. The machine-learning tool appraises the value of the features 502 as they correlate to the training data 504. The result of the training is the trained machine-learning program 510.

When the trained machine-learning program 510 is used to perform an assessment, new data 508 is provided as an input to the trained machine-learning program 510, and the trained machine-learning program 510 generates the assessment 512 as output.

Figure 6:
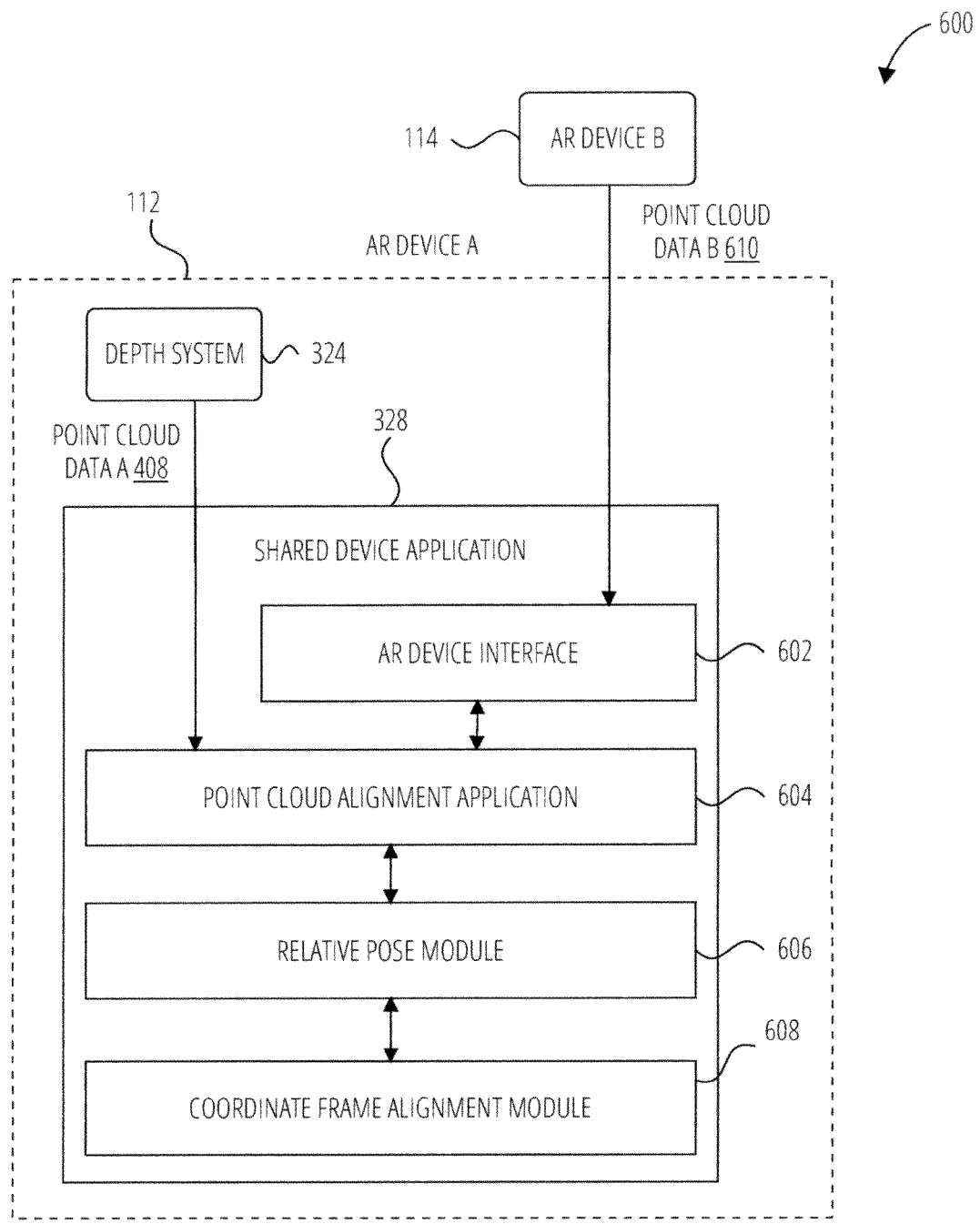
FIG. 6 is a block diagram illustrating a shared device application in accordance with one example embodiment.

FIG. 6 is a block diagram illustrating a shared device application 328 in accordance with one example embodiment. The shared device application 328 includes an AR device interface 602, a point cloud alignment application 604, a relative pose module 606, and a coordinate frame alignment module 608. The AR device interface 602 is configured to communicate with AR device B 114 (e.g., via Bluetooth, wireless network). In one example, the AR device interface 602 accesses the point cloud data B 610 from the AR device B 114.

The point cloud alignment application 604 accesses point cloud data A 408 from depth system 324 and point cloud data B 610 from AR device interface 602. The point cloud alignment application 604 performs a joint alignment of both the point cloud data A 408 and point cloud data B 610. In one example, the point cloud alignment application 604 performs a Joint Registration of Multiple Point Sets (JRMPC) algorithm on the point cloud data A 408 and point cloud data B 610. In another example, the point cloud alignment application 604 performs an Iterative Closest Point (ICP) algorithm on the point cloud data A 408 and point cloud data B 610. Those of ordinary skills in the art will recognize that the point cloud alignment application 604 can use other joint point cloud alignment algorithms.

The relative pose module 606 determines the relative pose based on the aligned point cloud determined at point cloud alignment application 604. In one example, the relative pose module 606 determines the relative pose between the VIO reference frames of each AR device based on the aligned point cloud.

The coordinate frame alignment module 608 uses the relative pose to align in 3D the VIO reference coordinate frames of each AR device. It is noted that once the alignment of point cloud alignment application 604 is performed, connected AR devices (e.g., AR device A 112 and AR device B 114) do not need to be time-synced again. As such, the relative pose computation is performed only when the AR device A 112 and AR device B 114 are connected during a joint collaborative AR session (e.g., each AR device view a "same" virtual object in the real world environment 102). In another example, the coordinate frame alignment module 608 provides alignment data (e.g., relative pose of AR device A 112 relative to AR device B 114) to the AR application 310/graphical processing unit 318 for accurate placement/display of a virtual object.

Figure 7:
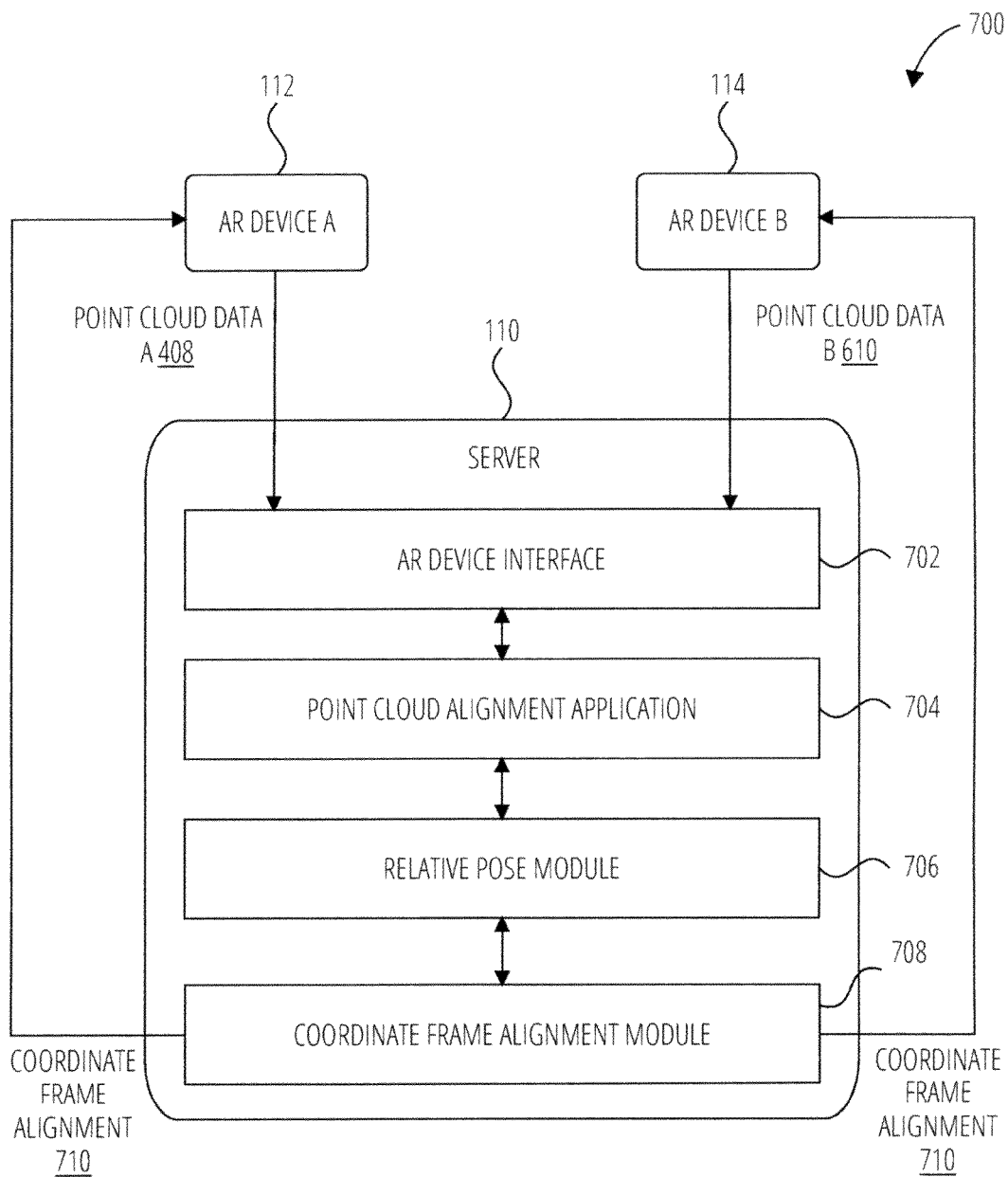
FIG. 7 is a block diagram illustrating a server in accordance with one example embodiment.

FIG. 7 is a block diagram illustrating a server 110 in accordance with one example embodiment. The server 110 includes an AR device interface 702, a point cloud alignment application 704, a relative pose module 706, and a coordinate frame alignment module 708. The AR device interface 702 is configured to communicate with both AR device A 112 and AR device B 114. In one example, the AR device interface 702 accesses the point cloud data A 408 from AR device A 112 and point cloud data B 610 from the AR device B 114.

The point cloud alignment application 704 accesses point cloud data A 408 and point cloud data B 610 from AR device interface 702. The point cloud alignment application 704 performs a joint alignment of both the point cloud data A 408 and point cloud data B 610. In one example, the point cloud alignment application 704 performs a Joint Registration of Multiple Point Sets (JRMPC) algorithm on the point cloud data A 408 and point cloud data B 610. In another example, the point cloud alignment application 704 performs an Iterative Closest Point (ICP) algorithm on the point cloud data A 408 and point cloud data B 610. Those of ordinary skills in the art will recognize that the point cloud alignment application 704 can use other joint point cloud alignment algorithms.

The relative pose module 706 determines the relative pose based on the aligned point cloud performed at point cloud alignment application 704. In one example, the relative pose module 706 determines the relative pose between the VIO reference frames of each AR device based on the aligned point cloud.

The coordinate frame alignment module 708 uses the relative pose to align in 3D the VIO reference coordinate frames of each AR device. In one example, the coordinate frame alignment module 608 provides coordinate frame alignment 710 (e.g., relative pose of AR device A 112 relative to AR device B 114) to the AR device A 112 and AR device B 114 for accurate placement/display of a virtual object.

Figure 8:
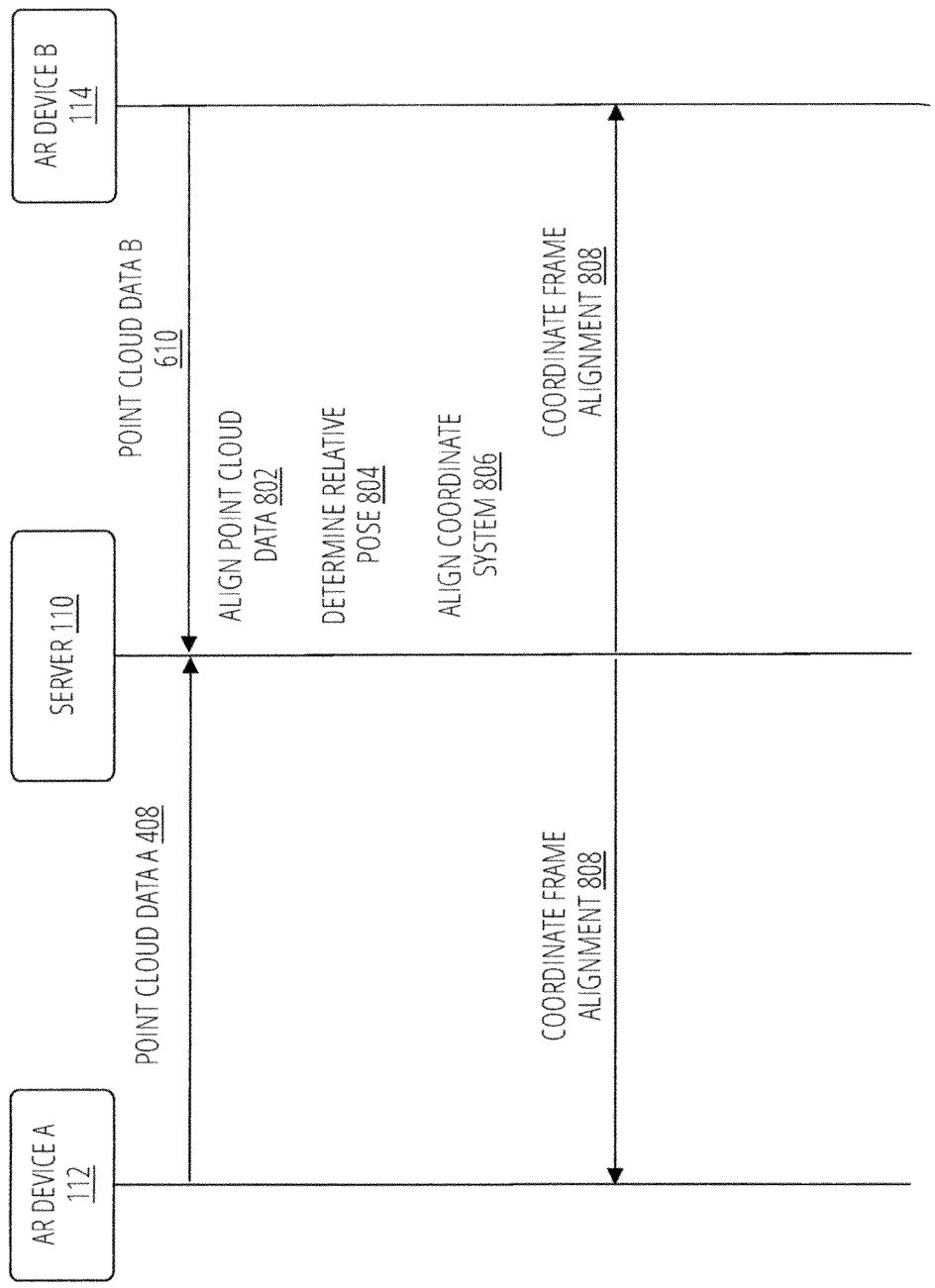
FIG. 8 is an interaction diagram illustrating an alignment operation in accordance with one example embodiment.

FIG. 8 is an interaction diagram illustrating an alignment operation in accordance with one example embodiment. The AR device A 112 sends point cloud data A 408 to the server 110 (to align reference frame with AR device B 114). The AR device B 114 sends point cloud data B 610 to the server 110 (to align reference frame with AR device A 112). Server 110 performs a registration process (e.g., align point cloud data 802, determine relative pose 804, align coordinate system 806) and provides coordinate frame alignment 808 to both AR device A 112 and AR device B 114.

Figure 9:
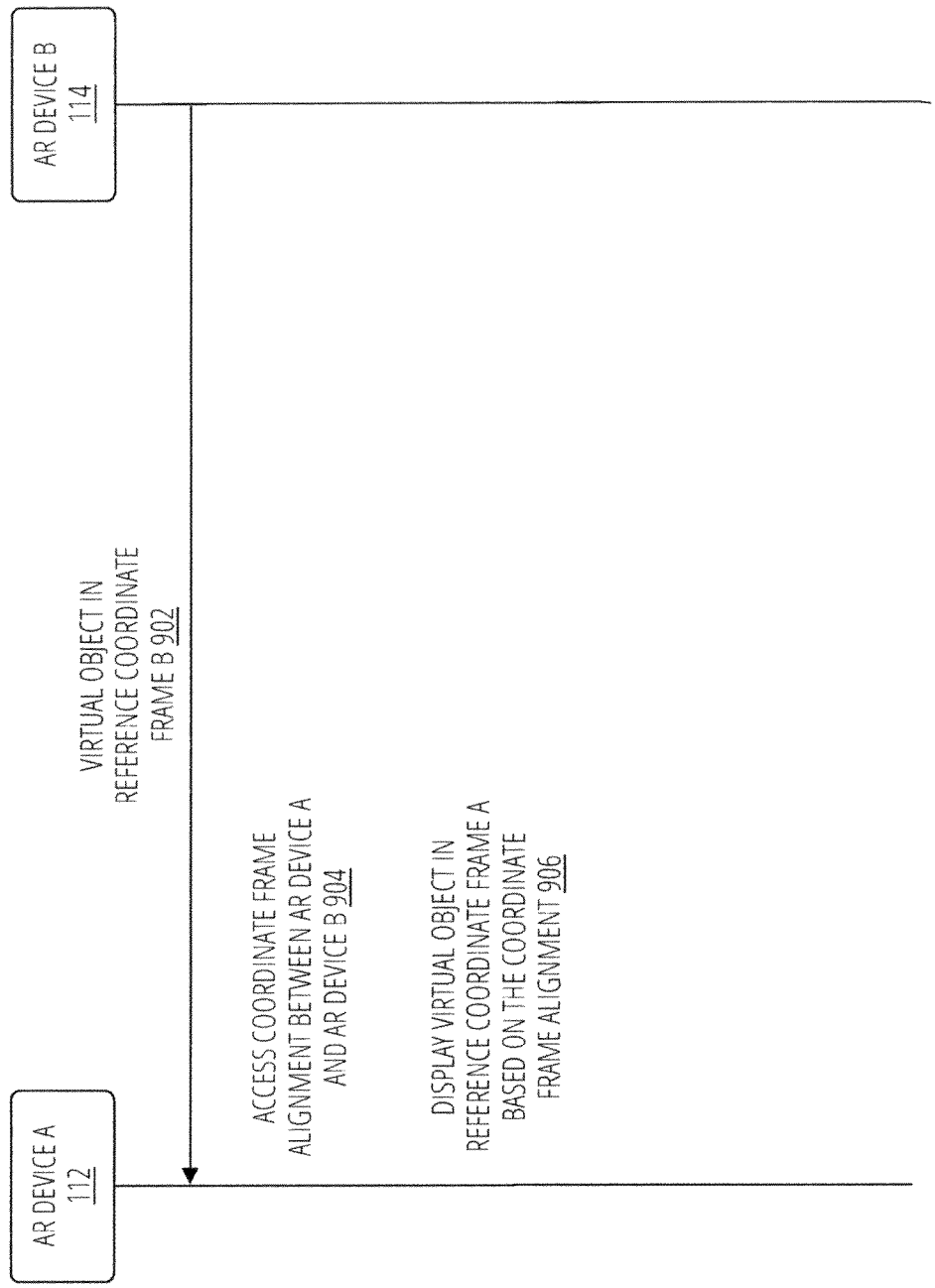
FIG. 9 is an interaction diagram illustrating a collaborative AR experience in accordance with one example embodiment.

FIG. 9 is an interaction diagram illustrating a collaborative AR experience in accordance with one example embodiment. The AR device A 112 identifies virtual object in reference coordinate frame B 902. The AR device A 112 displays the virtual object based on the aligned reference frames by (access coordinate frame alignment between AR device A and AR device B 904, and display virtual object in reference coordinate frame A based on the coordinate frame alignment 906).

Figure 10:
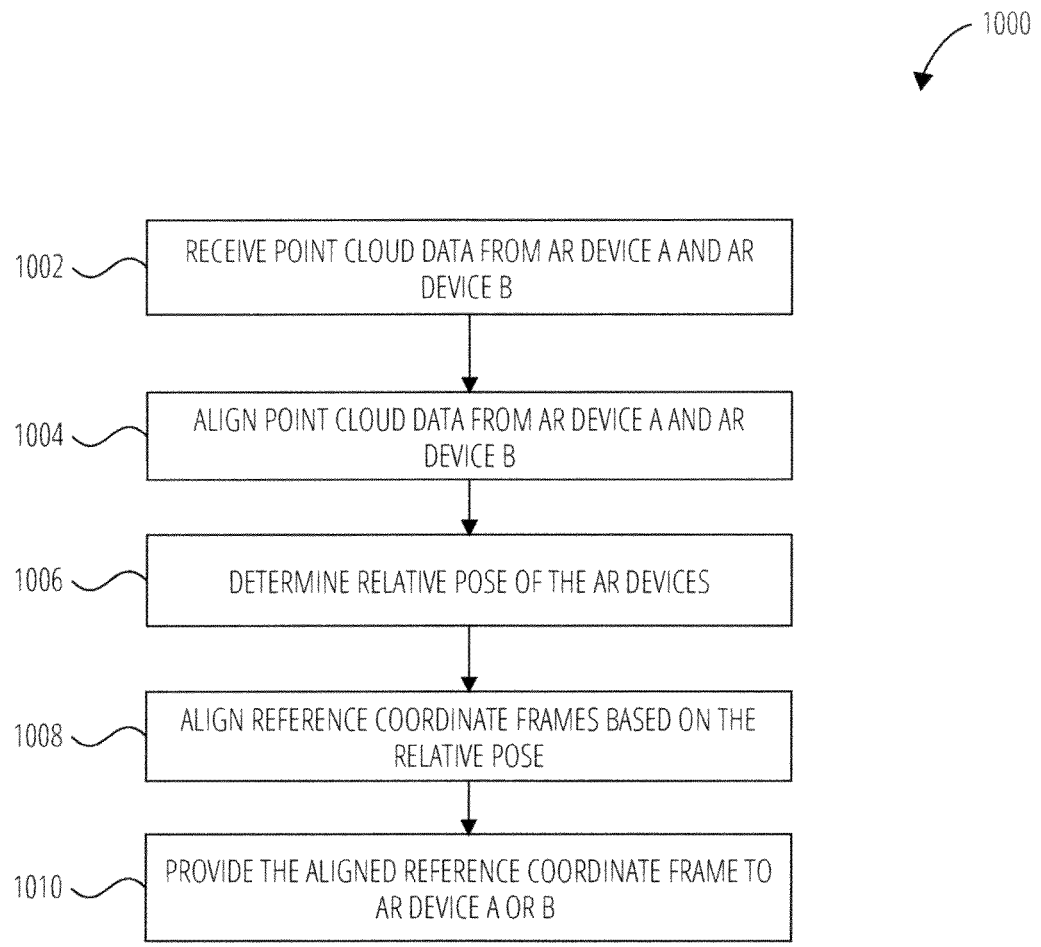
FIG. 10 is a flow diagram illustrating a method for aligning reference coordinate frames in accordance with one example embodiment.

FIG. 10 is a flow diagram illustrating a method 1000 for aligning reference coordinate frames in accordance with one example embodiment. Operations in the method 1000 may be performed by the AR device A 112, using components (e.g., modules, engines) described above with respect to FIG. 6. Accordingly, the method 1000 is described by way of example with reference to the AR device A 112. However, it shall be appreciated that at least some of the operations of the method 1000 may be deployed on various other hardware configurations or be performed by similar components residing elsewhere.

In block 1002, the shared device application 328 receives point cloud data from depth system 324 of AR device A 112 and AR device B 114. In block 1004, the point cloud alignment application 604 aligns point cloud data from AR device A 112 and AR device B 114. In block 1006, the relative pose module 606 determines relative pose of the AR device A 112 and AR device B 114. In block 1008, the coordinate frame alignment module 608 aligns reference coordinate frames based on the relative pose. In block 1010, the coordinate frame alignment module 608 provides the aligned reference coordinate frame to AR application 310 of AR device A 112 and/or AR device B 114.

It is to be noted that other embodiments may use different sequencing, additional or fewer operations, and different nomenclature or terminology to accomplish similar functions. In some embodiments, various operations may be performed in parallel with other operations, either in a synchronous or asynchronous manner. The operations described herein were chosen to illustrate some principles of operations in a simplified form.

Figure 11:
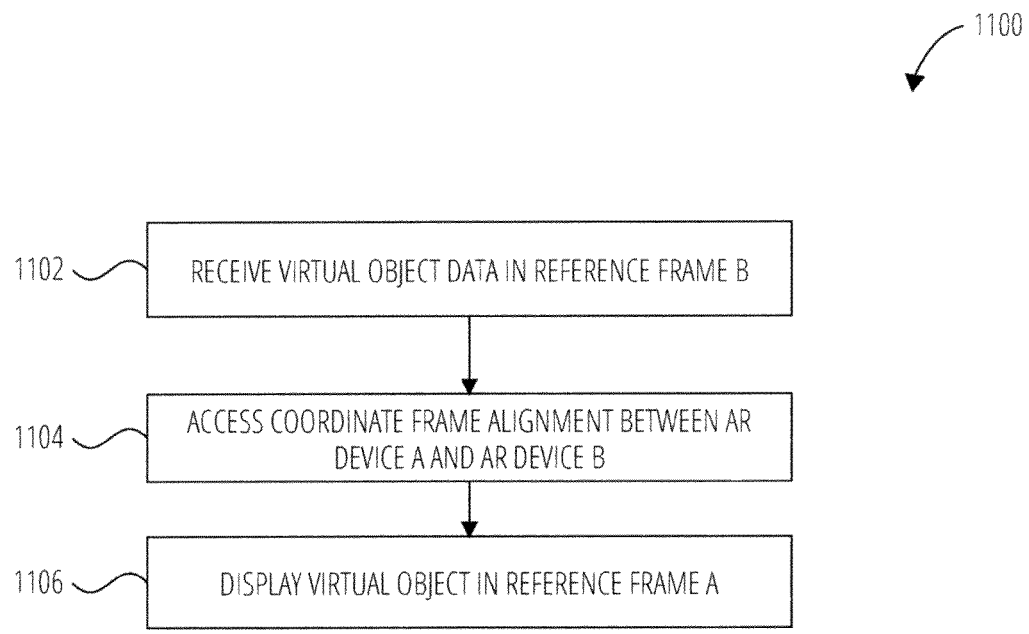
FIG. 11 is a flow diagram illustrating a method for sharing an AR experience in accordance with one example embodiment.

FIG. 11 is a flow diagram illustrating a method 1100 for sharing an AR experience in accordance with one example embodiment. Operations in the method 1100 may be performed by the AR device A 112, using components (e.g., modules, engines) described above with respect to FIG. 3. Accordingly, the method 1100 is described by way of example with reference to the AR device A 112. However, it shall be appreciated that at least some of the operations of the method 1100 may be deployed on various other hardware configurations or be performed by similar components residing elsewhere.

In block 1102, the shared device application 328 receives virtual object data in reference frame b (e.g., reference frame of AR device B 114). In block 1104, the shared device application 328 accesses coordinate frame alignment between AR device A 112 and AR device B 114. In block 1106, the AR application 310 displays virtual object in reference frame a (e.g., reference frame of AR device A 112).

It is to be noted that other embodiments may use different sequencing, additional or fewer operations, and different nomenclature or terminology to accomplish similar functions. In some embodiments, various operations may be performed in parallel with other operations, either in a synchronous or asynchronous manner. The operations described herein were chosen to illustrate some principles of operations in a simplified form.

Figure 12:
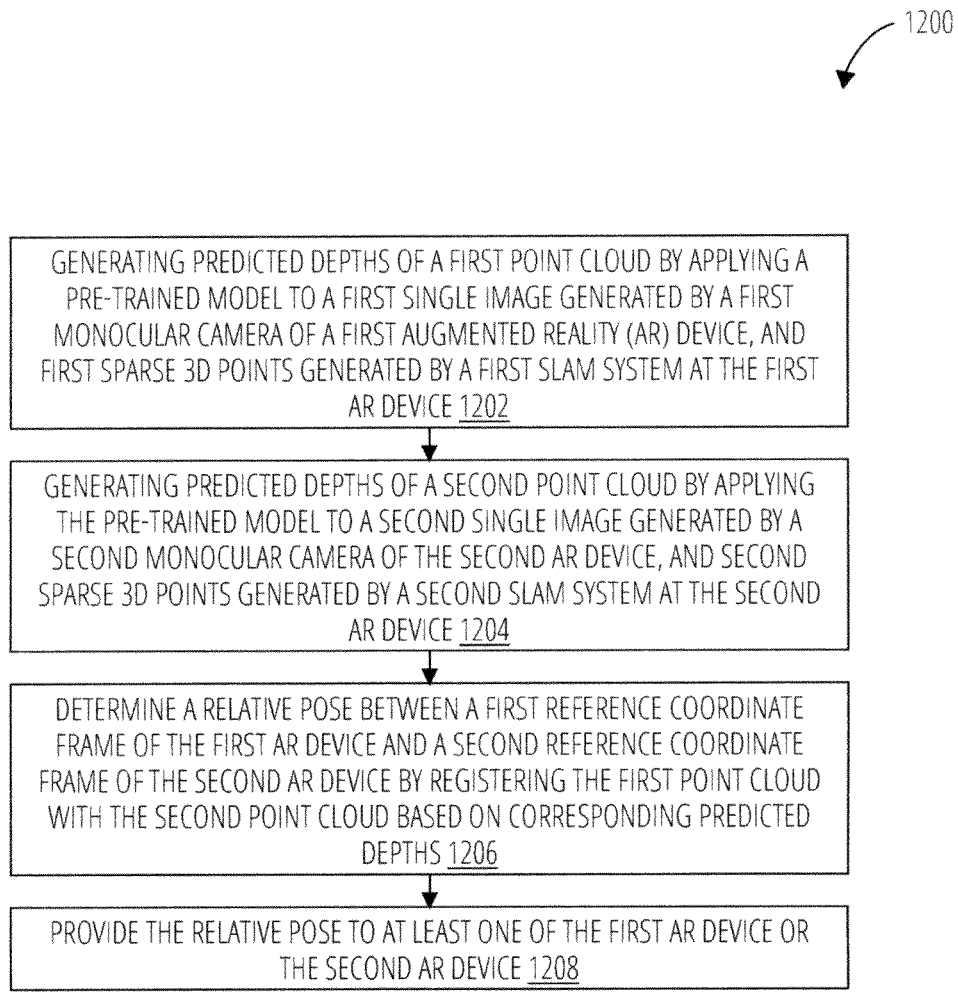
FIG. 12 illustrates a routine in accordance with one example embodiment.

FIG. 12 illustrates a routine 1200 in accordance with one example embodiment. In block 1202, routine 1200 generates predicted depths of a first point cloud by applying a pre-trained model to a first single image generated by a first monocular camera of a first augmented reality (AR) device, and first sparse 3D points generated by a first SLAM system at the first AR device. In block 1204, routine 1200 generates predicted depths of a second point cloud by applying the pre-trained model to a second single image generated by a second monocular camera of the second AR device, and second sparse 3D points generated by a second SLAM system at the second AR device. In block 1206, routine 1200 determines a relative pose between a first reference coordinate frame of the first AR device and a second reference coordinate frame of the second AR device by registering the first point cloud with the second point cloud based on corresponding predicted depths. In block 1208, routine 1200 provides the relative pose to at least one of the first AR device or the second AR device.

Figure 13:
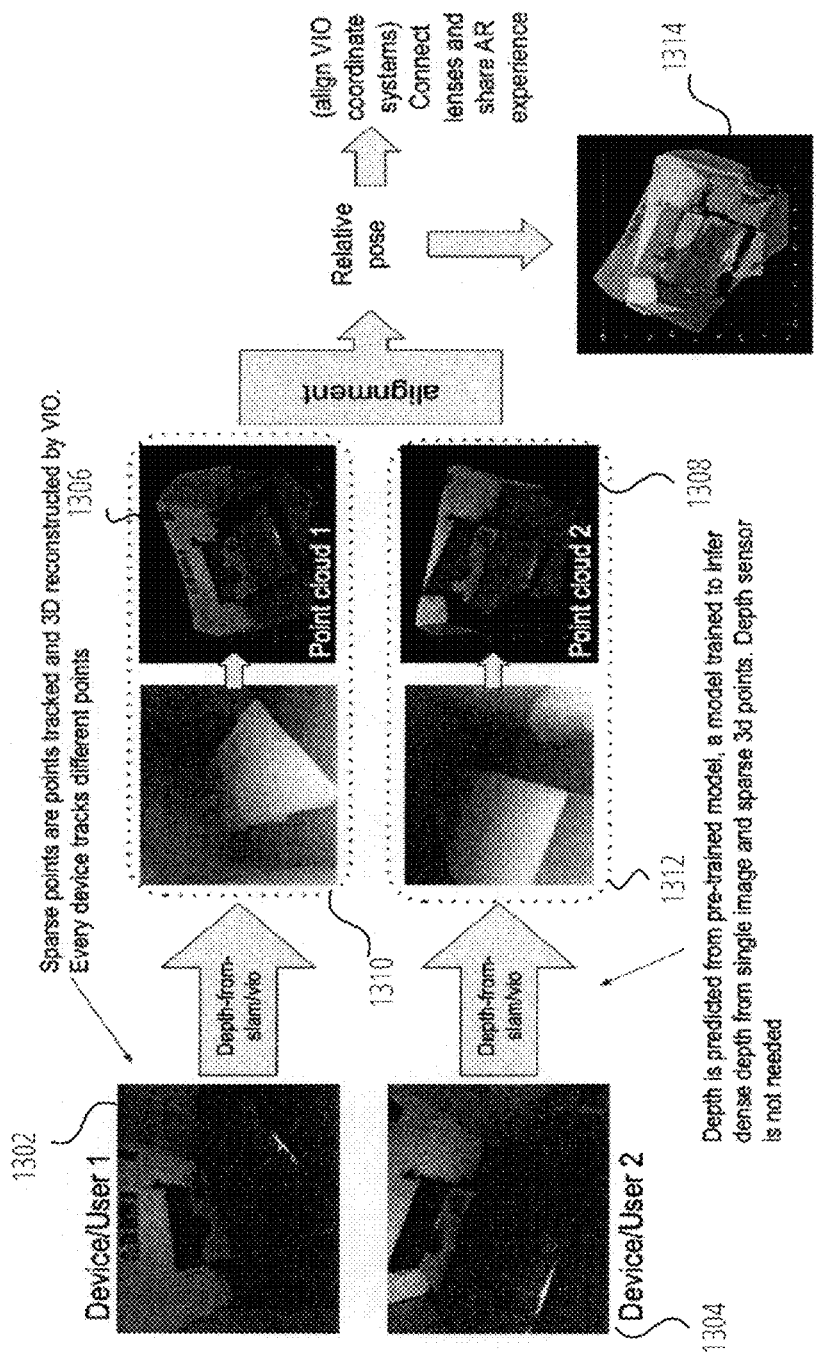
FIG. 13 is a diagram illustrating aligning coordinate systems from two AR devices in accordance with one embodiment.

FIG. 13 is a diagram illustrating aligning coordinate systems from two AR devices in accordance with one embodiment. As shown, different images of a scene are captured by the different devices and sparse points are captured in each image. The depth of the sparse points are predicted using a pre-trained model and a point cloud is generated for each image. A partial overlap of the points clouds is used to align the two point clouds, which is then used to determine the relative pose of each device.

A monocular camera of a first AR device generates monocular image A 1302. A monocular camera of a second AR device generates monocular image B 1304. The monocular image A 1302 and the sparse 3D points A 1310 are applied to a pre-trained model to predict predicted point cloud A 1306. The monocular image B 1304 and the sparse 3D points A 1312 are applied to the same pre-trained model to predict predicted point cloud A 1308. The predicted point cloud A 1306 and predicted point cloud A 1308 are registered/aligned. The relative pose of the AR devices is determined based on the registered point clouds 1314.

System with Head-Wearable Apparatus

Figure 14:
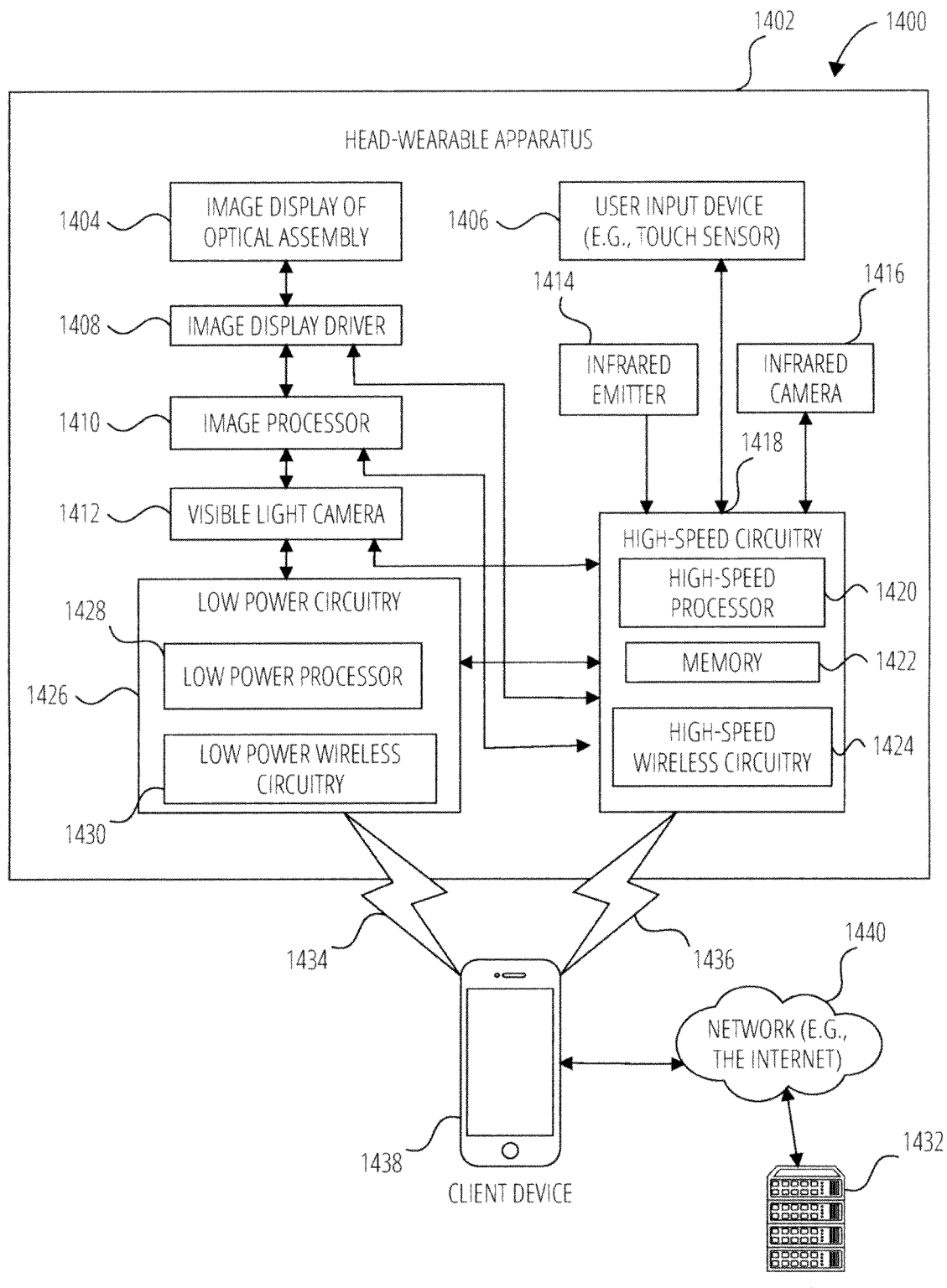
FIG. 14 illustrates a network environment in which a head-wearable device can be implemented according to one example embodiment.

FIG. 14 illustrates a network environment 1400 in which the head-wearable apparatus 1402 can be implemented according to one example embodiment. FIG. 14 is a high-level functional block diagram of an example head-wearable apparatus 1402 communicatively coupled a mobile client device 1438 and a server system 1432 via various network 1440.

head-wearable apparatus 1402 includes a camera, such as at least one of visible light camera 1412, infrared emitter 1414 and infrared camera 1416. The client device 1438 can be capable of connecting with head-wearable apparatus 1402 using both a communication 1434 and a communication 1436. client device 1438 is connected to server system 1432 and network 1440. The network 1440 may include any combination of wired and wireless connections.

The head-wearable apparatus 1402 further includes two image displays of the image display of optical assembly 1404. The two include one associated with the left lateral side and one associated with the right lateral side of the head-wearable apparatus 1402. The head-wearable apparatus 1402 also includes image display driver 1408, image processor 1410, low-power low power circuitry 1426, and high-speed circuitry 1418. The image display of optical assembly 1404 are for presenting images and videos, including an image that can include a graphical user interface to a user of the head-wearable apparatus 1402.

The image display driver 1408 commands and controls the image display of the image display of optical assembly 1404. The image display driver 1408 may deliver image data directly to the image display of the image display of optical assembly 1404 for presentation or may have to convert the image data into a signal or data format suitable for delivery to the image display device. For example, the image data may be video data formatted according to compression formats, such as H. 264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (Exif) or the like.

As noted above, head-wearable apparatus 1402 includes a frame and stems (or temples) extending from a lateral side of the frame. The head-wearable apparatus 1402 further includes a user input device 1406 (e.g., touch sensor or push button) including an input surface on the head-wearable apparatus 1402. The user input device 1406 (e.g., touch sensor or push button) is to receive from the user an input selection to manipulate the graphical user interface of the presented image.

The components shown in FIG. 14 for the head-wearable apparatus 1402 are located on one or more circuit boards, for example a PCB or flexible PCB, in the rims or temples. Alternatively, or additionally, the depicted components can be located in the chunks, frames, hinges, or bridge of the head-wearable apparatus 1402. Left and right can include digital camera elements such as a complementary metal-oxide-semiconductor (CMOS) image sensor, charge coupled device, a camera lens, or any other respective visible or light capturing elements that may be used to capture data, including images of scenes with unknown objects.

The head-wearable apparatus 1402 includes a memory 1422 which stores instructions to perform a subset or all of the functions described herein. memory 1422 can also include storage device.

As shown in FIG. 14, high-speed circuitry 1418 includes high-speed processor 1420, memory 1422, and high-speed wireless circuitry 1424. In the example, the image display driver 1408 is coupled to the high-speed circuitry 1418 and operated by the high-speed processor 1420 in order to drive the left and right image displays of the image display of optical assembly 1404. high-speed processor 1420 may be any processor capable of managing high-speed communications and operation of any general computing system needed for head-wearable apparatus 1402. The high-speed processor 1420 includes processing resources needed for managing high-speed data transfers on communication 1436 to a wireless local area network (WLAN) using high-speed wireless circuitry 1424. In certain examples, the high-speed processor 1420 executes an operating system such as a LINUX operating system or other such operating system of the head-wearable apparatus 1402 and the operating system is stored in memory 1422 for execution. In addition to any other responsibilities, the high-speed processor 1420 executing a software architecture for the head-wearable apparatus 1402 is used to manage data transfers with high-speed wireless circuitry 1424. In certain examples, high-speed wireless circuitry 1424 is configured to implement Institute of Electrical and Electronic Engineers (IEEE) 1402.11 communication standards, also referred to herein as Wi-Fi. In other examples, other high-speed communications standards may be implemented by high-speed wireless circuitry 1424.

The low power wireless circuitry 1430 and the high-speed wireless circuitry 1424 of the head-wearable apparatus 1402 can include short range transceivers (Bluetooth™) and wireless wide, local, or wide area network transceivers (e.g., cellular or WiFi). The client device 1438, including the transceivers communicating via the communication 1434 and communication 1436, may be implemented using details of the architecture of the head-wearable apparatus 1402, as can other elements of network 1440.

The memory 1422 includes any storage device capable of storing various data and applications, including, among other things, camera data generated by the left and right, infrared camera 1416, and the image processor 1410, as well as images generated for display by the image display driver 1408 on the image displays of the image display of optical assembly 1404. While memory 1422 is shown as integrated with high-speed circuitry 1418, in other examples, memory 1422 may be an independent standalone element of the head-wearable apparatus 1402. In certain such examples, electrical routing lines may provide a connection through a chip that includes the high-speed processor 1420 from the image processor 1410 or low power processor 1428 to the memory 1422. In other examples, the high-speed processor 1420 may manage addressing of memory 1422 such that the low power processor 1428 will boot the high-speed processor 1420 any time that a read or write operation involving memory 1422 is needed.

As shown in FIG. 14, the low power processor 1428 or high-speed processor 1420 of the head-wearable apparatus 1402 can be coupled to the camera (visible light camera 1412; infrared emitter 1414, or infrared camera 1416), the image display driver 1408, the user input device 1406 (e.g., touch sensor or push button), and the memory 1422.

The head-wearable apparatus 1402 is connected with a host computer. For example, the head-wearable apparatus 1402 is paired with the client device 1438 via the communication 1436 or connected to the server system 1432 via the network 1440. server system 1432 may be one or more computing devices as part of a service or network computing system, for example, that include a processor, a memory, and network communication interface to communicate over the network 1440 with the client device 1438 and head-wearable apparatus 1402.

The client device 1438 includes a processor and a network communication interface coupled to the processor. The network communication interface allows for communication over the network 1440, communication 1434 or communication 1436. client device 1438 can further store at least portions of the instructions for generating a binaural audio content in the client device 1438's memory to implement the functionality described herein.

Output components of the head-wearable apparatus 1402 include visual components, such as a display such as a liquid crystal display (LCD), a plasma display panel (PDP), a light emitting diode (LED) display, a projector, or a waveguide. The image displays of the optical assembly are driven by the image display driver 1408. The output components of the head-wearable apparatus 1402 further include acoustic components (e.g., speakers), haptic components (e.g., a vibratory motor), other signal generators, and so forth. The input components of the head-wearable apparatus 1402, the client device 1438, and server system 1432, such as the user input device 1406, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 1402 may optionally include additional peripheral device elements. Such peripheral device elements may include biometric sensors, additional sensors, or display elements integrated with head-wearable apparatus 1402. For example, peripheral device elements may include any I/O components including output components, motion components, position components, or any other such elements described herein.

For example, the biometric components include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), WiFi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over and communication 1436 from the client device 1438 via the low power wireless circuitry 1430 or high-speed wireless circuitry 1424.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Changes and modifications may be made to the disclosed embodiments without departing from the scope of the present disclosure. These and other changes or modifications are intended to be included within the scope of the present disclosure, as expressed in the following claims.

Figure 15:
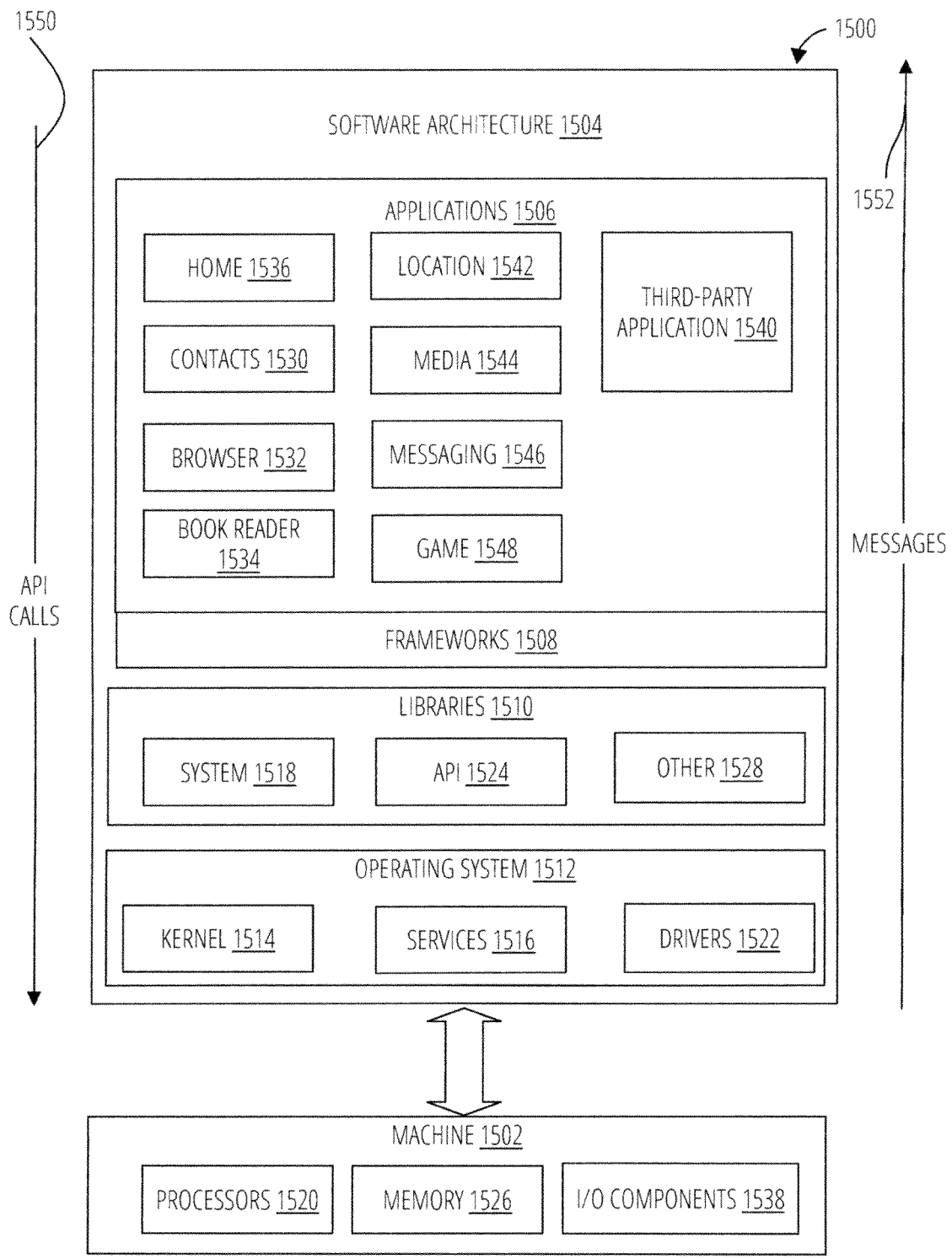
FIG. 15 is block diagram showing a software architecture within which the present disclosure may be implemented, according to an example embodiment.

FIG. 15 is a block diagram 1500 illustrating a software architecture 1504, which can be installed on any one or more of the devices described herein. The software architecture 1504 is supported by hardware such as a machine 1502 that includes Processors 1520, memory 1526, and I/O Components 1538. In this example, the software architecture 1504 can be conceptualized as a stack of layers, where each layer provides a particular functionality. The software architecture 1504 includes layers such as an operating system 1512, libraries 1510, frameworks 1508, and applications 1506. Operationally, the applications 1506 invoke API calls 1550 through the software stack and receive messages 1552 in response to the API calls 1550.

The operating system 1512 manages hardware resources and provides common services. The operating system 1512 includes, for example, a kernel 1514, services 1516, and drivers 1522. The kernel 1514 acts as an abstraction layer between the hardware and the other software layers. For example, the kernel 1514 provides memory management, Processor management (e.g., scheduling), Component management, networking, and security settings, among other functionality. The services 1516 can provide other common services for the other software layers. The drivers 1522 are responsible for controlling or interfacing with the underlying hardware. For instance, the drivers 1522 can include display drivers, camera drivers, BLUETOOTH® or BLU-ETOOTH® Low Energy drivers, flash memory drivers, serial communication drivers (e.g., Universal Serial Bus (USB) drivers), WI-FI® drivers, audio drivers, power management drivers, and so forth.

The libraries 1510 provide a low-level common infrastructure used by the applications 1506. The libraries 1510 can include system libraries 1518 (e.g., C standard library) that provide functions such as memory allocation functions, string manipulation functions, mathematic functions, and the like. In addition, the libraries 1510 can include API libraries 1524 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1510 can also include a wide variety of other libraries 1528 to provide many other APIs to the applications 1506.

The frameworks 1508 provide a high-level common infrastructure that is used by the applications 1506. For example, the frameworks 1508 provide various graphical user interface (GUI) functions, high-level resource management, and high-level location services. The frameworks 1508 can provide a broad spectrum of other APIs that can be used by the applications 1506, some of which may be specific to a particular operating system or platform.

In an example embodiment, the applications 1506 may include a home application 1536, a contacts application 1530, a browser application 1532, a book reader application 1534, a location application 1542, a media application 1544, a messaging application 1546, a game application 1548, and a broad assortment of other applications such as a third-party application 1540. The applications 1506 are programs that execute functions defined in the programs. Various programming languages can be employed to create one or more of the applications 1506, structured in a variety of manners, such as object-oriented programming languages (e.g., Objective-C, Java, or C++) or procedural programming languages (e.g., C or assembly language). In a specific example, the third-party application 1540 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1540 can invoke the API calls 1550 provided by the operating system 1512 to facilitate functionality described herein.

Figure 16:
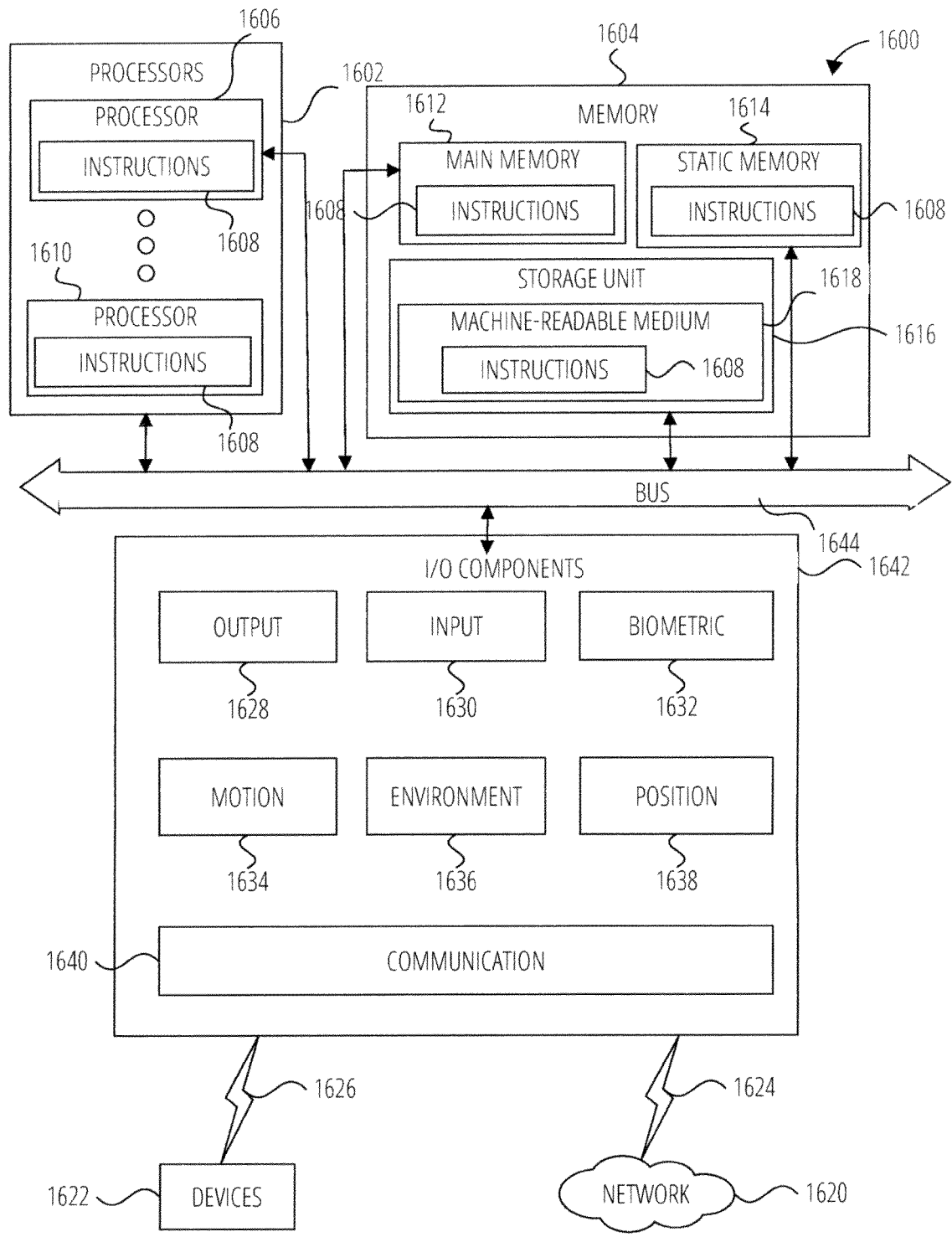
FIG. 16 is a diagrammatic representation of a machine in the form of a computer system within which a set of instructions may be executed for causing the machine to perform any one or more of the methodologies discussed herein, according to one example embodiment.

FIG. 16 is a diagrammatic representation of the machine 1600 within which instructions 1608 (e.g., software, a program, an application, an applet, an app, or other executable code) for causing the machine 1600 to perform any one or more of the methodologies discussed herein may be executed. For example, the instructions 1608 may cause the machine 1600 to execute any one or more of the methods described herein. The instructions 1608 transform the general, non-programmed machine 1600 into a particular machine 1600 programmed to carry out the described and illustrated functions in the manner described. The machine 1600 may operate as a standalone device or may be coupled (e.g., networked) to other machines. In a networked deployment, the machine 1600 may operate in the capacity of a server machine or a client machine in a server-client network environment, or as a peer machine in a peer-to-peer (or distributed) network environment. The machine 1600 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1608, sequentially or otherwise, that specify actions to be taken by the machine 1600. Further, while only a single machine 1600 is illustrated, the term "machine" shall also be taken to include a collection of machines that individually or jointly execute the instructions 1608 to perform any one or more of the methodologies discussed herein.

The machine 1600 may include Processors 1602, memory 1604, and I/O Components 1642, which may be configured to communicate with each other via a bus 1644. In an example embodiment, the Processors 1602 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an ASIC, a Radio-Frequency Integrated Circuit (RFIC), another Processor, or any suitable combination thereof) may include, for example, a Processor 1606 and a Processor 1610 that execute the instructions 1608. The term "Processor" is intended to include multi-core Processors that may comprise two or more independent Processors (sometimes referred to as "cores") that may execute instructions contemporaneously. Although FIG. 16 shows multiple Processors 1602, the machine 1600 may include a single Processor with a single core, a single Processor with multiple cores (e.g., a multi-core Processor), multiple Processors with a single core, multiple Processors with multiples cores, or any combination thereof.

The memory 1604 includes a main memory 1612, a static memory 1614, and a storage unit 1616, both accessible to the Processors 1602 via the bus 1644. The main memory 1604, the static memory 1614, and storage unit 1616 store the instructions 1608 embodying any one or more of the methodologies or functions described herein. The instructions 1608 may also reside, completely or partially, within the main memory 1612, within the static memory 1614, within machine-readable medium 1618 within the storage unit 1616, within at least one of the Processors 1602 (e.g., within the Processor's cache memory), or any suitable combination thereof, during execution thereof by the machine 1600.

The I/O Components 1642 may include a wide variety of Components to receive input, provide output, produce output, transmit information, exchange information, capture measurements, and so on. The specific I/O Components 1642 that are included in a particular machine will depend on the type of machine. For example, portable machines such as mobile phones may include a touch input device or other such input mechanisms, while a headless server machine will likely not include such a touch input device. It will be appreciated that the I/O Components 1642 may include many other Components that are not shown in FIG. 16. In various example embodiments, the I/O Components 1642 may include output Components 1628 and input Components 1630. The output Components 1628 may include visual Components (e.g., a display such as a plasma display panel (PDP), a light emitting diode (LED) display, a liquid crystal display (LCD), a projector, or a cathode ray tube (CRT)), acoustic Components (e.g., speakers), haptic Components (e.g., a vibratory motor, resistance mechanisms), other signal generators, and so forth. The input Components 1630 may include alphanumeric input Components (e.g., a keyboard, a touch screen configured to receive alphanumeric input, a photo-optical keyboard, or other alphanumeric input Components), point-based input Components (e.g., a mouse, a touchpad, a trackball, a joystick, a motion sensor, or another pointing instrument), tactile input Components (e.g., a physical button, a touch screen that provides location and/or force of touches or touch gestures, or other tactile input Components), audio input Components (e.g., a microphone), and the like.

In further example embodiments, the I/O Components 1642 may include biometric Components 1632, motion Components 1634, environmental Components 1636, or position Components 1638, among a wide array of other Components. For example, the biometric Components 1632 include Components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion Components 1634 include acceleration sensor Components (e.g., accelerometer), gravitation sensor Components, rotation sensor Components (e.g., gyroscope), and so forth. The environmental Components 1636 include, for example, illumination sensor Components (e.g., photometer), temperature sensor Components (e.g., one or more thermometers that detect ambient temperature), humidity sensor Components, pressure sensor Components (e.g., barometer), acoustic sensor Components (e.g., one or more microphones that detect background noise), proximity sensor Components (e.g., infrared sensors that detect nearby objects), gas sensors (e.g., gas detection sensors to detection concentrations of hazardous gases for safety or to measure pollutants in the atmosphere), or other Components that may provide indications, measurements, or signals corresponding to a surrounding physical environment. The position Components 1638 include location sensor Components (e.g., a GPS receiver Component), altitude sensor Components (e.g., altimeters or barometers that detect air pressure from which altitude may be derived), orientation sensor Components (e.g., magnetometers), and the like.

Communication may be implemented using a wide variety of technologies. The I/O Components 1642 further include communication Components 1640 operable to couple the machine 1600 to a network 1620 or devices 1622 via a coupling 1624 and a coupling 1626, respectively. For example, the communication Components 1640 may include a network interface Component or another suitable device to interface with the network 1620. In further examples, the communication Components 1640 may include wired communication Components, wireless communication Components, cellular communication Components, Near Field Communication (NFC) Components, Bluetooth® Components (e.g., Bluetooth® Low Energy), WiFi® Components, and other communication Components to provide communication via other modalities. The devices 1622 may be another machine or any of a wide variety of peripheral devices (e.g., a peripheral device coupled via a USB).

Moreover, the communication Components 1640 may detect identifiers or include Components operable to detect identifiers. For example, the communication Components 1640 may include Radio Frequency Identification (RFID) tag reader Components, NFC smart tag detection Components, optical reader Components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection Components (e.g., microphones to identify tagged audio signals). In addition, a variety of information may be derived via the communication Components 1640, such as location via Internet Protocol (IP) geolocation, location via Wi-Fi® signal triangulation, location via detecting an NFC beacon signal that may indicate a particular location, and so forth.

The various memories (e.g., memory 1604, main memory 1612, static memory 1614, and/or memory of the Processors 1602) and/or storage unit 1616 may store one or more sets of instructions and data structures (e.g., software) embodying or used by any one or more of the methodologies or functions described herein. These instructions (e.g., the instructions 1608), when executed by Processors 1602, cause various operations to implement the disclosed embodiments.

The instructions 1608 may be transmitted or received over the network 1620, using a transmission medium, via a network interface device (e.g., a network interface Component included in the communication Components 1640) and using any one of a number of well-known transfer protocols (e.g., hypertext transfer protocol (HTTP)). Similarly, the instructions 1608 may be transmitted or received using a transmission medium via the coupling 1626 (e.g., a peer-to-peer coupling) to the devices 1622.

As used herein, the terms "Machine-Storage Medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of Machine-Storage Media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "Machine-Storage Media," "computer-storage media," and "device-storage media" specifically exclude carrier waves, modulated data signals, and other such media, at least some of which are covered under the term "signal medium" discussed below.

The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1416 for execution by the machine 1400, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "Computer-Readable Medium," and "device-readable medium" mean the same thing and may be used interchangeably in this disclosure. The terms are defined to include both Machine-Storage Media and transmission media. Thus, the terms include both storage devices/media and carrier waves/modulated data signals.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

EXAMPLES

Example 1 is a method comprising: generating predicted depths of a first point cloud by applying a pre-trained model to a first single image generated by a first monocular camera of a first augmented reality (AR) device, and first sparse 3D points generated by a first SLAM system at the first AR device; generating predicted depths of a second point cloud by applying the pre-trained model to a second single image generated by a second monocular camera of the second AR device, and second sparse 3D points generated by a second SLAM system at the second AR device; determining a relative pose between a first reference coordinate frame of the first AR device and a second reference coordinate frame of the second AR device by registering the first point cloud with the second point cloud based on corresponding predicted depths; and providing the relative pose to at least one of the first AR device or the second AR device.

Example 2 includes the method of example 1, further comprising: rendering a first virtual object in a first display of the first AR device based on the relative pose; and rendering a second virtual object in a second display of the second AR device based on the relative pose, wherein the second virtual object corresponds to the first virtual object.

Example 3 includes the method of example 1, further comprising: accessing the first sparse 3D points from a six-degrees of freedom (6DOF) tracker of the first AR device.

Example 4 includes the method of example 3, wherein the 6DOF tracker comprises a Visual Inertial-Simultaneous Localization and Mapping (VI-SLAM) system.

Example 5 includes the method of example 1, wherein the pre-trained model is a machine learning model trained with images captured by a plurality of camera devices.

Example 6 includes the method of example 1, wherein a server is configured to: communicate with the first AR device and the second AR device; determine the relative pose by registering overlapping regions of the first point cloud and the second point cloud; and provide the relative pose to at least one of the first AR device or the second AR device.

Example 7 includes the method of example 1, wherein the first AR device communicates with the second AR device, wherein the first AR device is configured to receive the second point cloud from the second AR device, and to determine the relative pose.

Example 8 includes the method of example 1, further comprising: generating predicted depths of a third point cloud by applying the pre-trained model to a third single image generated by a third monocular camera of a third AR device, and third sparse 3D points generated by a third SLAM system at the third AR device; determining a first relative pose between a first reference coordinate frame of the first AR device and a second reference coordinate frame of the second AR device by registering the first point cloud with the second point cloud; determining a second relative pose between the first reference coordinate frame of the first AR device and a third reference coordinate frame of the third AR device by registering the first point cloud with the third point cloud; providing the first relative pose to the second AR device; and providing the second relative pose to the third AR device.

Example 9 includes the method of example 1, further comprising: generating predicted depths of a third point cloud by applying the pre-trained model to a third single image generated by a third monocular camera of a third AR device, and third sparse 3D points generated by a third SLAM system at the third AR device; and identifying, using a new reference coordinate frame common to the first AR device, the second AR device, and the third AR device, a first pose of the first AR device based on the depths of the first point cloud, a second pose of the second AR device based on the depths of the second point cloud, and a third pose of the third AR device based on the depths of the third point cloud by registering overlapping regions of the first point cloud, the second point cloud, and the third point cloud for the new reference coordinate frame.

Example 10 includes the method of example 1, wherein the first AR device is configured to generate the first point cloud from the first single image and first sparse 3D points, the first point cloud being denser than the first sparse 3D points.

Example 11 is a computing apparatus comprising: a processor; and a memory storing instructions that, when executed by the processor, configure the apparatus to: generate predicted depths of a first point cloud by applying a pre-trained model to a first single image generated by a first monocular camera of a first augmented reality (AR) device, and first sparse 3D points generated by a first SLAM system at the first AR device; generate predicted depths of a second point cloud by applying the pre-trained model to a second single image generated by a second monocular camera of the second AR device, and second sparse 3D points generated by a second SLAM system at the second AR device; determine a relative pose between a first reference coordinate frame of the first AR device and a second reference coordinate frame of the second AR device by registering the first point cloud with the second point cloud based on corresponding predicted depths; and provide the relative pose to at least one of the first AR device or the second AR device.

Example 12 is the computing apparatus of example 11, wherein the instructions further configure the apparatus to: render a first virtual object in a first display of the first AR device based on the relative pose; and render a second virtual object in a second display of the second AR device based on the relative pose, wherein the second virtual object corresponds to the first virtual object.

Example 13 is the computing apparatus of example 11, wherein the instructions further configure the apparatus to: access the first sparse 3D points from a six-degrees of freedom (6DOF) tracker of the first AR device.

Example 14 is the computing apparatus of example 13, wherein the 6DOF tracker comprises a Visual Inertial-Simultaneous Localization and Mapping (VI-SLAM) system.

Example 15 is the computing apparatus of example 11, wherein the pre-trained model is a machine learn model trained with images captured by a plurality of camera devices.

Example 16 is the computing apparatus of example 11, wherein a server is configured to: communicate with the first AR device and the second AR device; determine the relative pose by registering overlap regions of the first point cloud and the second point cloud; and provide the relative pose to at least one of the first AR device or the second AR device.

Example 17 is the computing apparatus of example 11, wherein the first AR device communicates with the second AR device, wherein the first AR device is configured to receive the second point cloud from the second AR device, and to determine the relative pose.

Example 18 is the computing apparatus of example 11, wherein the instructions further configure the apparatus to: generate predicted depths of a third point cloud by applying the pre-trained model to a third single image generated by a third monocular camera of a third AR device, and third sparse 3D points generated by a third SLAM system at the third AR device; determine a first relative pose between a first reference coordinate frame of the first AR device and a second reference coordinate frame of the second AR device by registering the first point cloud with the second point cloud; determine a second relative pose between the first reference coordinate frame of the first AR device and a third reference coordinate frame of the third AR device by registering the first point cloud with the third point cloud; provide the first relative pose to the second AR device; and provide the second relative pose to the third AR device.

Example 19 is the computing apparatus of example 11, generate predicted depths of a third point cloud by applying the pre-trained model to a third single image generated by a third monocular camera of a third AR device, and third sparse 3D points generated by a third SLAM system at the third AR device; and identify, using a new reference coordinate frame common to the first AR device, the second AR device, and the third AR device, a first pose of the first AR device based on the depths of the first point cloud, a second pose of the second AR device based on the depths of the second point cloud, and a third pose of the third AR device based on the depths of the third point cloud by registering overlapping regions of the first point cloud, the second point cloud, and the third point cloud for the new reference coordinate frame.

Example 20 is a non-transitory computer-readable storage medium, the computer-readable storage medium including instructions that when executed by a computer, cause the computer to: generate predicted depths of a first point cloud by applying a pre-trained model to a first single image generated by a first monocular camera of a first augmented reality (AR) device, and first sparse 3D points generated by a first SLAM system at the first AR device; generate predicted depths of a second point cloud by applying the pre-trained model to a second single image generated by a second monocular camera of the second AR device, and second sparse 3D points generated by a second SLAM system at the second AR device; determine a relative pose between a first reference coordinate frame of the first AR device and a second reference coordinate frame of the second AR device by registering the first point cloud with the second point cloud based on corresponding predicted depths; and provide the relative pose to at least one of the first AR device or the second AR device.

Described implementations of the subject matter can include one or more features, alone or in combination as illustrated below by way of example.

What is claimed is:

1. A method comprising:
generating, at a first augmented reality (AR) device, predicted depths of a first point cloud by applying a pre-trained model to a first single image generated by a first monocular camera of the first AR device, and first sparse 3D points generated by a first SLAM (Simultaneous Localization and Mapping) system at the first AR device, wherein the pre-trained model is configured to combine the first single image data with the concurrently generated first sparse 3D points to yield the predicted depths in a single pass without requiring a separate environment map;

receiving, at the first AR device, predicted depths of a second point cloud from a second AR device, the predicted depths of the second point cloud generated at the second AR device by applying the pre-trained model to a second single image generated by a second monocular camera of the second AR device, and second sparse 3D points generated by a second SLAM system at the second AR device;

determining, at the first AR device, a relative pose between a first reference coordinate frame of the first AR device and a second reference coordinate frame of the second AR device by registering the first point cloud with the second point cloud based on corresponding predicted depths; and providing the relative pose to the second AR device.

2. The method of claim 1, further comprising:

rendering a first virtual object in a first display of the first AR device based on the relative pose; and rendering a second virtual object in a second display of the second AR device based on the relative pose, wherein the second virtual object corresponds to the first virtual object.

3. The method of claim 1, further comprising:

accessing the first sparse 3D points from a six-degrees of freedom (6DOF) tracker of the first AR device.

4. The method of claim 3, wherein the 6DOF tracker comprises a Visual Inertial-Simultaneous Localization and Mapping (VI-SLAM) system.

5. The method of claim 1, wherein the pre-trained model is a machine learning model trained with images captured by a plurality of camera devices.

6. The method of claim 1, wherein a server is configured to:

communicate with the first AR device and the second AR device;

determine the relative pose by registering overlapping regions of the first point cloud and the second point cloud; and provide the relative pose to at least one of the first AR device or the second AR device.

7. The method of claim 1, wherein the first AR device communicates with the second AR device, wherein the first AR device is configured to receive the second point cloud from the second AR device, and to determine the relative pose.

8. The method of claim 1, further comprising:

generating predicted depths of a third point cloud by applying the pre-trained model to a third single image generated by a third monocular camera of a third AR device, and third sparse 3D points generated by a third SLAM system at the third AR device;

determining a first relative pose between a first reference coordinate frame of the first AR device and a second reference coordinate frame of the second AR device by registering the first point cloud with the second point cloud;

determining a second relative pose between the first reference coordinate frame of the first AR device and a third reference coordinate frame of the third AR device by registering the first point cloud with the third point cloud;

providing the first relative pose to the second AR device; and providing the second relative pose to the third AR device.

9. The method of claim 1, further comprising:

generating predicted depths of a third point cloud by applying the pre-trained model to a third single image generated by a third monocular camera of a third AR device, and third sparse 3D points generated by a third SLAM system at the third AR device; and identifying, using a new reference coordinate frame common to the first AR device, the second AR device, and the third AR device, a first pose of the first AR device based on the depths of the first point cloud, a second pose of the second AR device based on the depths of the second point cloud, and a third pose of the third AR device based on the depths of the third point cloud by registering overlapping regions of the first point cloud, the second point cloud, and the third point cloud for the new reference coordinate frame.

10. The method of claim 1, wherein the first AR device is configured to generate the first point cloud from the first single image and first sparse 3D points, the first point cloud being denser than the first sparse 3D points, wherein the first AR device registers the first point cloud with the second point cloud by performing one of a Joint Registration of Multiple Point Sets (JRMPC) algorithm on the first point cloud and the second point cloud, or an Iterative Closest Point (ICP) algorithm on the first point cloud and the second point cloud.

11. A first augmented reality (AR) device comprising:

a processor; and a memory storing instructions that, when executed by the processor, configure the first AR device to:

generate predicted depths of a first point cloud by applying a pre-trained model to a first single image generated by a first monocular camera of the first AR device, and first sparse 3D points generated by a first SLAM (Simultaneous Localization and Mapping) system at the first AR device, wherein the pre-trained model is configured to combine the first single image data with the concurrently generated first sparse 3D points to yield the predicted depths in a single pass without requiring a separate environment map;

receive predicted depths of a second point cloud from a second AR device, the predicted depths generated at the second AR device by applying the pre-trained model to a second single image generated by a second monocular camera of the second AR device, and second sparse 3D points generated by a second SLAM system at the second AR device;

determine a relative pose between a first reference coordinate frame of the first AR device and a second reference coordinate frame of the second AR device by registering the first point cloud with the second point cloud based on corresponding predicted depths; and provide the relative pose to the second AR device.

12. The first AR device of claim 11, wherein the instructions further configure the first AR device to:

render a first virtual object in a first display of the first AR device based on the relative pose; and render a second virtual object in a second display of the second AR device based on the relative pose, wherein the second virtual object corresponds to the first virtual object.

13. The first AR device of claim 11, wherein the instructions further configure the first AR device to:

access the first sparse 3D points from a six-degrees of freedom (6DOF) tracker of the first AR device.

14. The first AR device of claim 13, wherein the 6DOF tracker comprises a Visual Inertial-Simultaneous Localization and Mapping (VI-SLAM) system.

15. The first AR device of claim 11, wherein the pre-trained model is a machine learning model trained with images captured by a plurality of camera devices.

16. The first AR device of claim 11, wherein a server is configured to:
communicate with the first AR device and the second AR device;
determine the relative pose by registering overlap regions of the first point cloud and the second point cloud; and
provide the relative pose to at least one of the first AR device or the second AR device.

17. The first AR device of claim 11, wherein the first AR device communicates with the second AR device, wherein the first AR device is configured to receive the second point cloud from the second AR device, and to determine the relative pose.

18. The first AR device of claim 11, wherein the instructions further configure the first AR device to:
generate predicted depths of a third point cloud by applying the pre-trained model to a third single image generated by a third monocular camera of a third AR device, and third sparse 3D points generated by a third SLAM system at the third AR device;
determine a first relative pose between a first reference coordinate frame of the first AR device and a second reference coordinate frame of the second AR device by registering the first point cloud with the second point cloud;
determine a second relative pose between the first reference coordinate frame of the first AR device and a third reference coordinate frame of the third AR device by registering the first point cloud with the third point cloud;
provide the first relative pose to the second AR device; and
provide the second relative pose to the third AR device.

19. The first AR device of claim 11, wherein the instructions further configure the first AR device to:
generate predicted depths of a third point cloud by applying the pre-trained model to a third single image generated by a third monocular camera of a third AR device, and third sparse 3D points generated by a third SLAM system at the third AR device; and
identify, using a new reference coordinate frame common to the first AR device, the second AR device, and the third AR device, a first pose of the first AR device based on the depths of the first point cloud, a second pose of the second AR device based on the depths of the second point cloud, and a third pose of the third AR device based on the depths of the third point cloud by registering overlapping regions of the first point cloud, the second point cloud, and the third point cloud for the new reference coordinate frame.

20. A non-transitory computer-readable storage medium, the computer-readable storage medium including instructions that when executed by a computer, cause the computer to:
generate, at a first augmented reality (AR) device, predicted depths of a first point cloud by applying a pre-trained model to a first single image generated by a first monocular camera of the first AR device, and first sparse 3D points generated by a first SLAM (Simultaneous Localization and Mapping) system at the first AR device, wherein the pre-trained model is configured to combine the first single image data with the concurrently generated first sparse 3D points to yield the predicted depths in a single pass without requiring a separate environment map;
receive, at the first AR device, predicted depths of a second point cloud from a second AR device, the predicted depths generated at the second AR device by applying the pre-trained model to a second single image generated by a second monocular camera of the second AR device, and second sparse 3D points generated by a second SLAM system at the second AR device;
determine, at the first AR device, a relative pose between a first reference coordinate frame of the first AR device and a second reference coordinate frame of the second AR device by registering the first point cloud with the second point cloud based on corresponding predicted depths; and
provide the relative pose to the second AR device.

* * * * *

UNITED STATES PATENT AND TRADEMARK OFFICE
CERTIFICATE OF CORRECTION

| | | |
|---|---|---|
| PATENT NO. | : 12,417,588 B2 | Page 1 of 1 |
| APPLICATION NO. | : 17/893723 | |
| DATED | : September 16, 2025 | |
| INVENTOR(S) | : Evangelidis et al. | |

It is certified that error appears in the above-identified patent and that said Letters Patent is hereby corrected as shown below:

On the Title Page

Item (30), in "Foreign Application Priority Data", in Column 1, Line 1, delete "0220100478" and insert --20220100478-- therefor Signed and Sealed this
Twenty-third Day of December, 2025

John A. Squires
*Director of the United States Patent and Trademark Office*